United States Patent
Ohya et al.

(10) Patent No.: US 7,017,825 B2
(45) Date of Patent: Mar. 28, 2006

(54) IC CARD AND DATA PROCESSING METHOD THEREFOR

(75) Inventors: Mitsuyoshi Ohya, Osaka (JP); Shinichi Tokumitsu, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 409 days.

(21) Appl. No.: 10/316,122

(22) Filed: Dec. 11, 2002

(65) Prior Publication Data
US 2003/0106942 A1    Jun. 12, 2003

(30) Foreign Application Priority Data
Dec. 11, 2001  (JP) .......................... P. 2001-376991
Jul. 29, 2002   (JP) .......................... P. 2002-219629

(51) Int. Cl.
G06K 19/06     (2006.01)
G06F 12/00     (2006.01)

(52) U.S. Cl. ...................... 235/492; 711/115
(58) Field of Classification Search ........... 235/492; 711/103, 115
See application file for complete search history.

(56) References Cited

U.S. PATENT DOCUMENTS

| 4,992,651 A | * | 2/1991 | Takahira ............... 235/492 |
| 5,579,502 A | * | 11/1996 | Konishi et al. ........ 711/103 |
| 5,590,306 A | * | 12/1996 | Watanabe et al. ...... 711/115 |
| 5,724,544 A | * | 3/1998 | Nishi ..................... 711/115 |
| 6,633,956 B1 | * | 10/2003 | Mitani ................... 711/115 |
| 2001/0012222 A1 | | 8/2001 | Terasaki |

FOREIGN PATENT DOCUMENTS

| CN | 02154252 | 5/2001 |
| EP | 0 935 255 A2 | 8/1999 |
| GB | 2 248 707 A | 4/1992 |
| GB | 2 349 242 A | 10/2000 |
| JP | 3-194682 | 8/1991 |
| JP | 9-223203 | 8/1997 |
| JP | 10-240631 | 9/1998 |
| JP | 2001-5928 | 1/2001 |
| JP | 2001-005928 | 1/2001 |
| JP | 2001-051883 | 2/2001 |

* cited by examiner

Primary Examiner—Karl D. Frech
Assistant Examiner—Jamara A. Franklin
(74) Attorney, Agent, or Firm—McDermott Will & Emery LLP

(57) ABSTRACT

Provided in a nonvolatile memory mounted in an IC card are a data block area 201, for storing data to be held; a reserve block area 202, for storing target data during a writing or reading process; and an address management area 203, for storing address data that correlate logical addresses and physical addresses associated with the data block area 201 and the reserve block area 202. In the writing process, data to be written is stored in the reserve block area 202, and for updating, address data that correspond to the reserve block area 202 in the address management area 203 and address data that corresponds to the data block area 201 designated by a command are rewritten.

26 Claims, 21 Drawing Sheets

IC CARD AND DATA PROCESSING METHOD THEREFOR

BACKGROUND OF THE INVENTION

1. Field of the Invention

The present invention relates to an IC card used as an electronic purse or an ID card, and a data processing method therefor, and relates in particular to a technique for processing data stored in a nonvolatile memory mounted in an IC card.

2. Description of the Related Art

A currently available IC card system, wherein a reader/writer reads and writes data in association with memories contained in IC cards, can be employed as tickets for using leisure facilities and as electronic purses used for financial institutions. The IC cards used with this system are contact IC cards, which exchange signals with a reader/writer while inserted therein, and non-contact IC cards, which communicate with a reader/writer by radio.

Incorporated in a contact IC card is an interface contact point whereby signals, including power signals, ground signals, clock signals, data signals and reset signals, and a stable power supply are received from a reader/writer. And incorporated in a non-contact IC card are an antenna coil and a capacitor whereby signals and a carrier wave, which is rectified in the IC card to supply power thereto, are received from a reader/writer.

If during the writing of data a contact IC card inserted into a reader/writer is removed or a non-contact IC card receives insufficient power because it is moved away from a communication area, data already stored in the memory in the IC card will be destroyed. The data stored in the memory are formed into blocks having a predetermined length, such as 16 bytes, and the reading and writing of a plurality of data blocks are performed by one command process. In any case, protection for the data must be ensured.

As a first solution for this problem, there is an old data backup, data protection method whereby when designated block data are to be written, old block data that were effective before the writing process was begun are temporarily stored in another nonvolatile memory area, and the designated block data are written thereafter. When multiple block data sets are to be written at the same time to a data block area consisting of multiple data blocks, first, block data having designated block numbers are stored in reserve data blocks in the reserve block area and are written to the data block area. Thus, even if the power is cut off while data are being written, since block data obtained before the writing process was begun are maintained in the reserve block area, the data can be returned to the original state and data protection is ensured.

As a second solution, there is a data protection method, involving the holding of validity data, whereby at least two memory areas are obtained and validity data indicating which memory area is effective is stored. Specifically, two memories, a data block area A and a data block area B, are obtained, and data validity determination data are stored to indicate which block data, identified by block numbers, are effective. Then, to write the block data, the data validity determination data are examined, new block data are written to a data block in an invalid memory area, and valid/invalid data are rewritten. As a result, the data writing process can be performed. And if, in this case, the power is cut off, since the block data are maintained that were effective before the writing process was performed, and since the validity determination data can be used to return to the state existing before the writing was performed, the original data can be restored.

By holding old data and performing a writing process as in the block data management system, protection of data is ensured when power is cut off.

However, according to the data protection method whereby old data is backed up and held, which is the first solution, extra time is required to perform the processing for holding the old data in another nonvolatile memory area. Especially during the process for writing multiple data blocks at the same time, the processing time is enormously increased, and when this method is employed for checking a transportation pass, the processing can not be completed until a commuter passes through a ticket gate and a failure occurs. Furthermore, for the data protection method according to which validity data is held, which is the second solution, two or more memory areas must be obtained, and this method is not efficient because the chip size is increased.

SUMMARY OF THE INVENTION

It is one objective of the present invention to provide an IC card for which processing can be performed rapidly and efficiently, while the protection of data is ensured when power is cut off, and a data processing method therefor.

To achieve this objective, according to a first aspect of the present invention, an IC card comprises:

- a memory having a data storage area for storing data to be held, a buffer area for storing target data during a writing process, and an address management area for storing address data for correlating logical addresses and physical addresses associated with the data storage area and the buffer area; and
- memory control means for storing in the buffer area, during a data writing process for the memory, write data that are transmitted with a command, and for rewriting address data that are stored in the address management area and that correspond to the buffer area and address data that correspond to the data storage area designated by the command, so that the address management area can be updated.

According to a second aspect, the memory includes:

- an address holding area for holding target address data that are stored in the address management area and that are to be updated; and
- a parameter area for storing writing-in-progress information indicating that a writing process is currently being performed. During the writing process, based on a logical address designated by the command, the memory control means temporarily stores in the address holding area physical addresses that correspond to the buffer area, and physical addresses that are stored in the address management area and that correspond to logical addresses in the data storage area designated by the command; places the writing-in-progress information in the parameter area; performs the updating process for rewriting the physical addresses that correspond to the buffer area and physical addresses that correspond to the data storage area in the address management area; and returns the writing-in-progress information to the original state.

According to a third aspect of the invention, during said writing process, said memory control means stores, in said parameter area, the total number of physical addresses to be updated and the number of currently updated blocks, both of which are used as said writing-in-progress information.

According to a fourth aspect of the present invention, the memory control means examines the writing-in-progress information to determine whether the writing process has been completed. When the writing process has not been normally performed, the memory control means resumes and completes the updating of unprocessed physical addresses based on the total number of blocks to be updated and the total number of updated blocks for the physical addresses that are stored in the parameter area and the address data held in the address holding areas.

According to a fifth aspect of the invention, during said writing process, said memory control means stores, in said buffer area, write data that is added to a command packet in parallel with a data transmission process.

According to a sixth aspect of the invention, during said writing process, said memory control means calculates error check data for said write data, which is performed essentially parallel to the process for storing said write data in said buffer area, and stores said error check data in correlation with said write data.

According to a seventh aspect of the present invention, an IC card comprises:
 a memory having a data storage area for storing data to be held, a buffer area for storing target data during a writing process, and an address management area for storing address data that correlates logical addresses and physical addresses associated with the data storage area and the buffer area; and
 memory control means for rewriting address data, during a data reading process performed for the memory, that correspond to the buffer area and address data that correspond to the data storage area designated by a command for the address management area, and updating the address management area, for reading read data stored in the buffer area that has been updated, and for returning the address management area to the original state.

According to an eighth aspect of the present invention, the memory includes
 an address holding area for holding address data that are stored in the address management area and are to be updated, and
 a parameter area for storing reading-in-progress information indicating that a reading process is currently being performed. During the reading process, the memory control means temporarily stores, in the address holding area, physical addresses that are stored in the address management area and that correspond to the buffer area; places the reading-in-progress information in the parameter area; performs the updating process for rewriting, to the physical addresses that correspond to the buffer area, physical addresses that correspond to the logical addresses of the data storage area designated by the command for the address management area; reads the read data from the buffer area that has been updated, and returns the physical addresses that have been stored and that correspond to the buffer area; and returns the reading-in-progress information to the original state.

According to a ninth aspect of the invention, during said reading process, said memory control means stores, in said parameter area, the total number of physical addresses to be restored and the number of currently restored blocks, both of which are used as said reading-in-progress information.

According to a tenth aspect of the present invention, the memory control means employs the reading-in-progress information to determine whether the reading process has been completed. When the reading process has not been normally performed, the memory control means resumes and completes the restoring of unprocessed physical addresses based on the total number of blocks to be restored and the total number of blocks restored for the physical addresses that are stored in the parameter area, and address data held in the address holding area.

According to an eleventh aspect of the invention, during said reading process, said memory control means reads read data from said buffer area, and adds said read data to a command packet in parallel with a data transmission process.

According to a twelfth aspect of the invention, during said reading process, said memory control means determines error check data for said read data, which is performed essentially parallel to the process for reading said read data from said buffer area, and when a data error is found, adds said error check data as abnormality data to a response packet.

According to a thirteenth aspect of the invention, for the IC card of the first or the seventh aspect, when data is to be read from or written to said data storage area and said buffer area, said memory control means is capable of switching between a method for directly designating a physical address and accessing data, and a method for using said address management area to convert a designated logical address into a physical address and accessing data.

According to a fourteenth aspect of the present invention, a data processing method for an IC card comprises the steps of:
 during a process for writing data to a memory of an IC card, storing write data received with a command in a buffer area of the memory; and
 rewriting, in an address management area for storing address data for said memory, address data that correspond to the buffer area and address data that correspond to the data storage area designated by a command, and updating the address management area.

According to a fifteenth aspect of the present invention, the data processing method further comprises the steps of:
 during the writing process, temporarily storing, in the address holding area, physical addresses that correspond to the buffer area and physical addresses that correspond to logical addresses for the data storage area designated by the command for the address management area;
 setting writing-in-progress information indicating that a writing process is currently being performed;
 rewriting physical addresses that correspond to the buffer area and physical addresses that correspond to the data storage area in the address management area, and updating the address management area; and
 restoring the writing-in-progress information after the updating has been completed.

According to a sixteenth aspect of the present invention, a data processing method for an IC card comprises the steps of:
 during a process for reading data from a memory of an IC card, updating an address management area by rewriting address data that correspond to a buffer area and address data that correspond to a data storage area designated by a command for the address management area in a memory for storing address data; and
 reading read data from the buffer area that has been updated, and returning the address management area to the original state.

According to a seventeenth aspect of the invention, the data processing method further comprises the steps of:

during the reading process, temporarily storing, in address holding area, physical addresses that are stored in address management area and that correspond to the buffer area;

setting reading-in-progress information indicating that a reading process is currently being performed;

performing the updating process by rewriting, to physical addresses that correspond to the buffer area, physical addresses that are stored in the address management area and that correspond to logical addresses in the data storage area designated by the command;

performing a restoring process during which read data are obtained from the buffer area that has been updated, and the physical addresses that were held and that correspond to the buffer area; and returning the reading-in-progress information to the original state after the restoring has been completed.

According to this invention, in the writing process for the memory, data to be transmitted in consonance with a write command is stored in the buffer area, and the address management area is updated by rewriting the address data, which are stored in the address management area, that correspond to the buffer area and the address data for the data storage area designated by the command. As a result, the process for temporarily storing write data in the buffer area and for copying this data to the data storage area is not required, and the writing process can be completed merely by storing the write data in the buffer area and updating the address data. Therefore, since the storage in the buffer area of the write data added to a command packet is performed substantially parallel to the data transmission, the writing process can be quickly and efficiently performed. Further, even if the power is cut off, when the power is restored, the writing process can be restarted, beginning at the point whereat the process was interrupted, and can be completed. Thus, a data error or loss can be prevented, and the continuing protection of data is ensured.

In addition, during the process for reading data from the memory, the address management area and the address area that corresponds to the buffer area are updated by rewriting the address data that are stored in the address management area and that correspond to the data storage area designated by a command. After read data have been obtained from the buffer area that has been updated, the address management area is returned to the original state. Therefore, the process for copying the read data from the data storage area to the buffer area and for reading this data is not required, and the reading process is completed by updating the address data, extracting the read data from the buffer area that has been updated, and restoring the address data. Thus, since the reading and the addition to a response packet of the read data stored in the buffer area can be performed substantially parallel to the data transmission process, the reading process can be efficiently and quickly performed. Further, even if the power is cut off, when the power is restored, the reading process can be restarted, beginning at the point whereat it was interrupted, and can be completed. Therefore, a data error or loss can be prevented, and the continuing protection of data is ensured.

It is a further objective of the present invention to provide an IC card for which, even when a large capacity data block area is employed, the data processing can be performed quickly and efficiently while ensuring that data are protected when the power is cut off, and a data processing method therefor.

To achieve this objective, according to a eighteenth aspect of the present invention, an IC card comprises:

a memory having one or more data storage areas for storing data to be held, one or more buffer areas for storing target data during a writing process, and one or more address management areas for storing address data for correlating logical addresses and physical addresses associated with the data storage areas and the buffer areas; and memory control means for storing in the buffer areas, during a data writing process for the memory, write data that are transmitted with a command, and for rewriting address data that are stored in the address management areas and that correspond to the buffer areas and address data that correspond to the data storage areas designated by the command, so that the address management areas can be updated.

According to a nineteenth aspect, the memory includes:

address holding areas for holding target address data that are stored in the address management areas and that are to be updated;

a buffer determination flag area for storing buffer area validity data indicating which of the buffer areas is valid; and a parameter area for storing writing-in-progress information indicating that a writing process is currently being performed. During the writing process, based on a logical address designated by the command, the memory control means selects one target data storage area and one target buffer area to which data are to be written; stores in the buffer determination flag area validity data designating the target areas; temporarily stores in the address holding areas physical addresses that correspond to the buffer areas, and physical addresses that are stored in the address management areas and that correspond to logical addresses in the data storage areas designated by the command; places the writing-in-progress information in the parameter area; performs the updating process, based on validity data in the buffer determination flag area, for rewriting the physical addresses that correspond to the buffer areas and physical addresses that correspond to the data storage areas in the address management area for the target areas that are valid; and returns the writing-in-progress information to the original state.

According to a twentieth aspect of the present invention, the memory control means examines the writing-in-progress information to determine whether the writing process has been completed. When the writing process has not been normally performed, the memory control means resumes and completes the updating of unprocessed physical addresses based on the total number of blocks to be updated and the total number of updated blocks for the physical addresses that are stored in the parameter area, the address data held in the address holding areas and the validity data stored in the buffer determination flag area.

According to a twenty-first aspect of the present invention, an IC card comprises:

a memory having one or more data storage areas for storing data to be held, one or more buffer areas for storing target data during a writing process, and one or more address management areas for storing address data that correlates logical addresses and physical addresses associated with the data storage areas and the buffer areas; and memory control means for rewriting address data, during a data reading process performed for the memory, that correspond to the buffer areas and address data that correspond to the data storage areas designated by a command for the address management area, and updating the address management area, for reading read data stored in the buffer areas that have been updated, and for returning the address management areas to the original state.

According to a twenty-second aspect of the present invention, the memory includes address holding areas for holding address data that are stored in the address management areas and are to be updated, a buffer determination flag area for storing buffer area validity data indicating which of the buffer areas is valid, and a parameter area for storing reading-in-progress information indicating that a reading process is currently being performed. During the reading process, the memory control means employs logical addresses designated by the command to select one target storage area and one target buffer area from which data are to be read; stores, in the buffer determination flag area, validity data designating the target areas; temporarily stores, in the address holding areas, physical addresses that are stored in the address management areas and that correspond to the buffer areas; places the reading-in-progress information in the parameter area; performs the updating process, based on the validity data in the buffer determination flag area, for rewriting, to the physical addresses that correspond to the buffer areas, physical addresses that correspond to the logical addresses of the data storage areas designated by the command for the address management area for the valid target areas; reads the read data from the buffer areas that have been updated, and returns the physical addresses that have been stored and that correspond to the buffer areas; and returns the reading-in-progress information to the original state.

According to a twenty-third aspect of the present invention, the memory control means employs the reading-in-progress information to determine whether the reading process has been completed. When the reading process has not been normally performed, the memory control means resumes and completes the restoring of unprocessed physical addresses based on the total number of blocks to be restored and the total number of blocks restored for the physical addresses that are stored in the parameter area, address data held in the address holding areas and the validity data in the buffer determination flag area.

According to a twenty-fourth aspect of the present invention, a data processing method for an IC card comprises the steps of:

during a process for writing data to a memory of an IC card, storing write data received with a command in buffer areas of the memory;

employing a logical address designated by the command to select, from among one or more storage areas and one or more buffer areas, a target storage area and a target buffer area to which data are to be written, and storing validity data designating the target areas in a buffer determination flag area;

temporarily storing, in address holding areas, physical addresses that correspond to the buffer areas and physical addresses that are stored in address management areas for storing address data for the memory and that correspond to logical addresses for the data storage areas designated by the command;

setting writing-in-progress information indicating that a writing process is currently being performed;

rewriting physical addresses, based on validity data in the buffer determination flag area, that correspond to the buffer areas and physical addresses that are stored in the address management area, for the valid target areas, and that correspond to the data storage areas, and updating the address management area; and restoring the writing-in-progress information after the updating has been completed.

According to an twenty-fifth aspect of the present invention, a data processing method for an IC card comprises the steps of:

during a process for reading data from a memory of an IC card, employing a logical address designated by a command to select, from among one or more data storage areas and one or more buffer areas, a target data storage area and a target buffer area from which data are to be read, and storing in a buffer determination flag area validity data designating the target areas;

temporarily storing, in address holding areas, physical addresses that are stored in address management areas of the memory for storing address data and that correspond to the target buffer areas;

setting reading-in-progress information indicating that a reading process is currently being performed;

based on the validity data in the buffer determination flag area, updating the address management area for the valid target areas by rewriting, to physical addresses that correspond to the buffer areas, physical addresses that are stored in the address management area and that correspond to logical addresses in the data storage areas designated by the command;

performing a restoring process during which read data are obtained from the buffer areas that have been updated, and the physical addresses that were held and that correspond to the buffer areas; and returning the reading-in-progress information to the original state after the restoring has been completed.

According to this invention, in the writing process for the memory, data to be transmitted in consonance with a write command is stored in the buffer area, and the address management area is updated by rewriting the address data, which are stored in the address management area, that correspond to the buffer area and the address data for the data storage area designated by the command. At this time, a data storage area and a buffer area to which data are to be written are selected from among one or more data storage areas and one or more buffer areas, and validity data indicating these target areas are stored in the buffer determination flag area. Based on this validity data in the buffer determination flag area, the address management area for a valid area is updated, and as a result, the process for temporarily storing write data in the buffer area and for copying this data to the data storage area is not required, and the writing process can be completed merely by storing the write data in the buffer area and updating the address data. Therefore, since the storage in the buffer area of the write data added to a command packet is performed substantially parallel to the data transmission, the writing process can be quickly and efficiently performed. Further, even if the power is cut off, when the power is restored, the writing process can be restarted, beginning at the point whereat the process was interrupted, and can be completed. Thus, a data error or loss can be prevented, and the continuing protection of data is ensured. Furthermore, for a memory having a large capacity data area, a drastic increase in the memory area used for system control, such as the address management area used for the writing process, can be prevented.

In addition, during the process for reading data from the memory, the address management area and the address area that corresponds to the buffer area are updated by rewriting the address data that are stored in the address management area and that correspond to the data storage area designated by a command. After read data have been obtained from the buffer area that has been updated, the address management area is returned to the original state, and at this time, a data storage area and a buffer area from which data are to be read are selected from among one or more data storage areas and one or more buffer areas, and validity data indicating these target areas are stored in the buffer determination flag area, while based on the validity data stored the buffer determination flag area, the address management area for a valid area is updated. Therefore, the process for copying the read data from the data storage area to the buffer area and for reading this data is not required, and the reading process is completed by updating the address data, extracting the read data from the buffer area that has been updated, and restoring the address data. Thus, since the reading and the addition to a response packet of the read data stored in the buffer area can be performed substantially parallel to the data transmission process, the reading process can be efficiently and quickly performed. Further, even if the power is cut off, when the power is restored, the reading process can be restarted, beginning at the point whereat it was interrupted, and can be completed. Therefore, a data error or loss can be prevented, and the continuing protection of data is ensured. Furthermore, for a data memory having a large capacity, a drastic increase in the memory area used for system control, such as the address management area used for the writing process, can be prevented.

DESCRIPTION OF THE PREFERRED EMBODIMENTS

Figure 1:
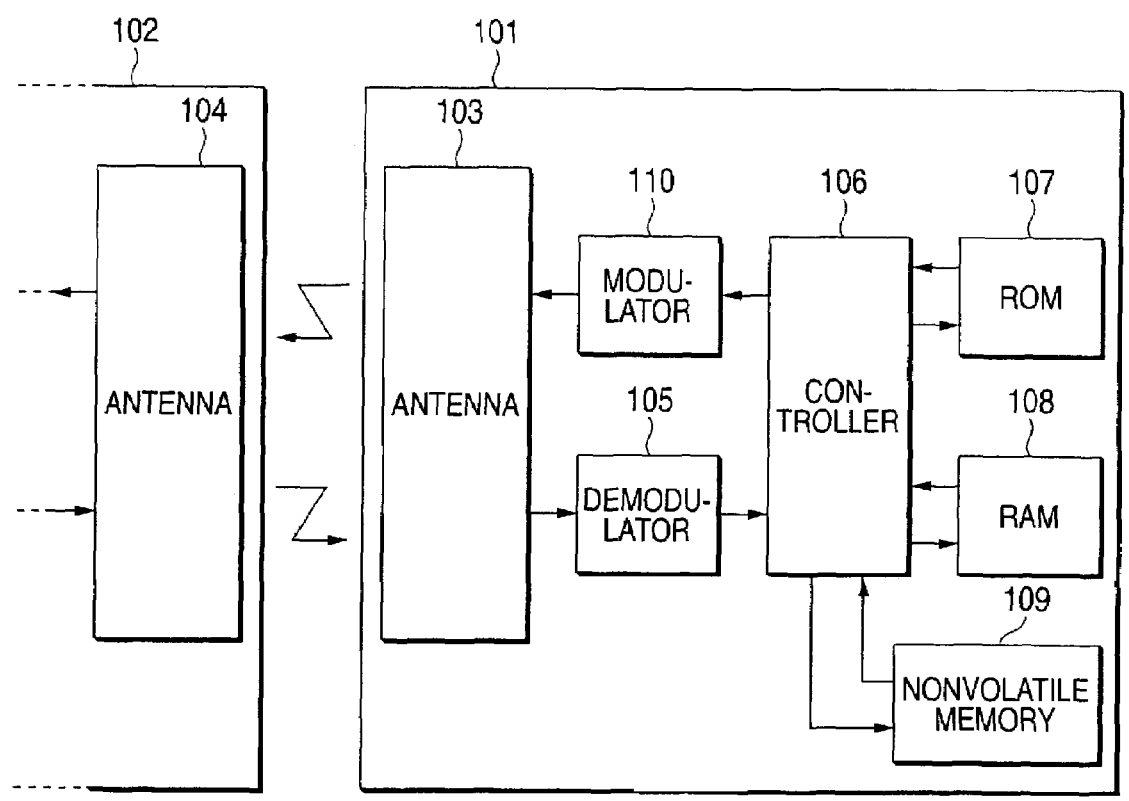
FIG. 1 is a block diagram showing the configuration of an IC card system according to one embodiment of the present invention.

The preferred embodiment of the present invention will now be described while referring to the drawings.

FIG. 1 is a block diagram showing the configuration of a non-contact IC card system for which a data processing method of one embodiment of the present invention is applied. Data exchanged by an IC card 101 and a reader/writer 102, which reads data from or writes data to the IC card 101, are transmitted by antennas 103 and 104 using electromagnetic induction. The reader/writer 102 internally prepares data that are transmitted, as a modulated signal, to the IC card 101 by the antenna 104. The antenna 103 of the IC card 101, which is present in a communication area, receives the modulated data, and the received data are demodulated by a demodulator 105 and transmitted to a controller 106.

The controller 106, which is constituted by a processor, such as a CPU, analyzes the received data in accordance with a control program stored in a ROM 107, which serves as a control memory, or stores the received data in a nonvolatile memory 109, an EEPROM (an Electrically Erasable Programmable ROM) or an FeRAM (a Ferroelectronic RAM). When a memory, such as an FeRAM, for which the writing speed is high is employed as the nonvolatile memory 109, the received data are written directly to the nonvolatile memory 109. The received data may instead be temporarily written to the transmission/reception buffer of the RAM 108.

Thereafter, using a data reading process and data writing process for the nonvolatile memory 109, transmission data, based on the received data, are prepared as a response. These transmission data, after passing through the controller 106, are modulated by a modulator 110 and the thus obtained modulated signal is transmitted by the antenna 103 to the reader/writer 102.

Figure 2:
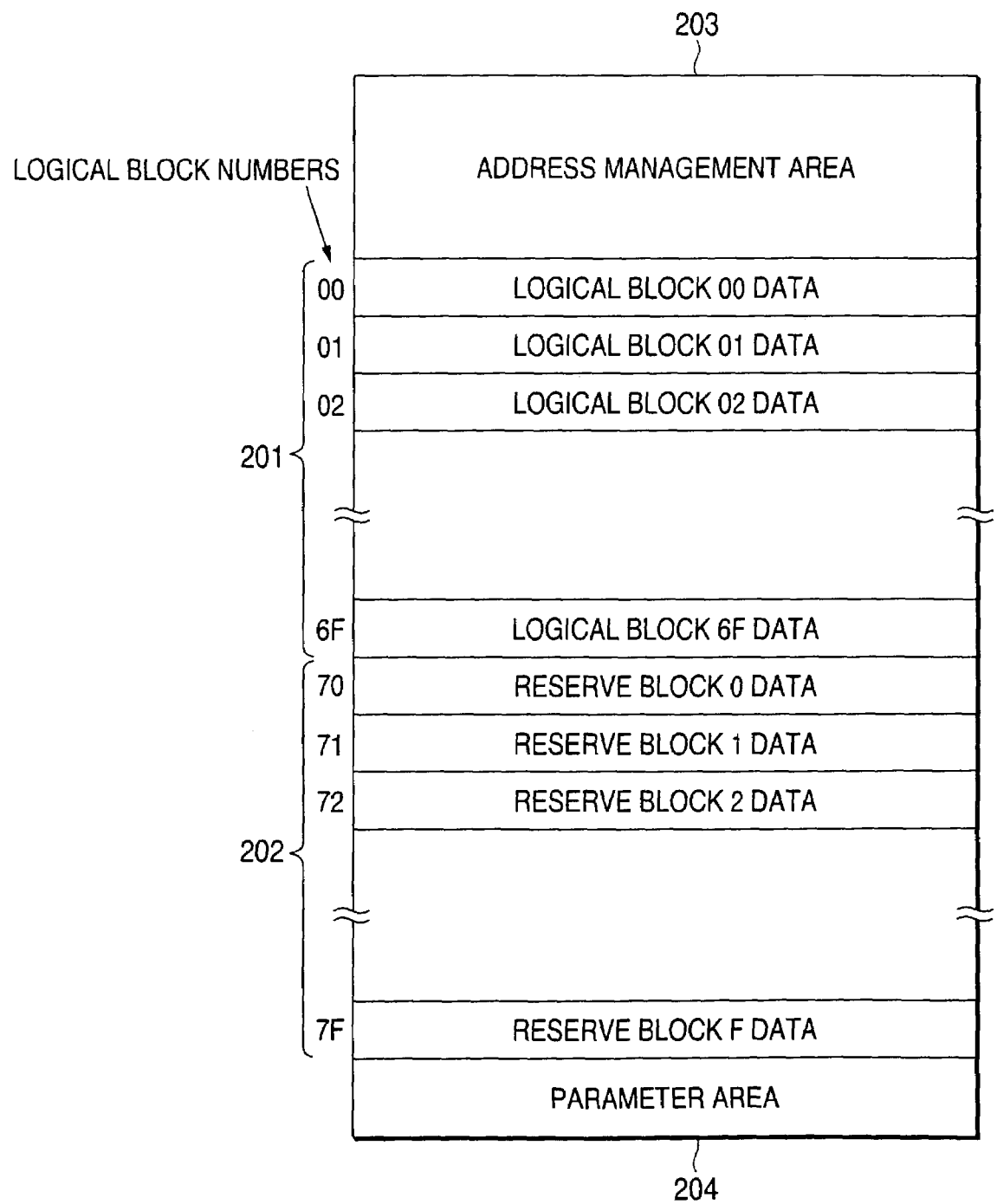
FIG. 2 is a diagram showing a memory structure in a logical memory space according to the embodiment.

The file structure shown in FIG. 2 is used for the nonvolatile memory 109 of the IC card 101 in FIG. 1, in logical memory space viewed by the reader/writer 102. That is, the nonvolatile memory 109 has a data block area 201 (corresponding to a data storage area) for storing data required by a user; a reserve block area 202 (corresponding to a buffer area) for storing data that are designated by the reader/writer 102 for the reading and writing of data relative to the IC card 101; an address management area 203 for storing address data used for correlating a logical memory space and a physical memory space for the nonvolatile memory 109 of the IC card 101; and a parameter area 204 for storing various parameters, including writing-in-progress information and reading-in-progress information used for data updating.

The data block area 201 and the reserve block area 202 are designed so that a plurality of data blocks, each of which has a predetermined data length, e.g., 16 bytes, are stored with logical block numbers as references. In the nonvolatile memory 109 in this embodiment shown in FIG. 2, 96 logical data blocks represented by logical block numbers 00, 01, 02, . . . and 6F are stored in the data block area 201, and 16 reserve data blocks represented by logical block numbers 70, 71, 72, . . . and 7F are stored in the reserve block area 202.

The reader/writer 102 can read data from and write data to the data block area 201 of the nonvolatile memory 109 contained in the IC card 101. In this case, the logical block number in the logical data block for which data reading/writing is to be performed is designated, so that the data reading/writing can be performed. Multiple logical block numbers may be designated by a single command, and by designating logical block numbers, 00 and 01, data reading/writing can be performed for multiple data blocks at the same time.

In the embodiment, during the data writing process, performed substantially parallel to the data transmission process, block data that are added to a write command and are designated to be written are sequentially stored in the reserve block area 202, beginning with reserve data block 0 up to reserve data block F. That is, when two sets of block data are written at the same time, the first designated block of data is stored in reserve data block 0, and the second designated block of data is stored in reserve data block 1.

During the data reading process, block data represented by the logical block numbers that are designated by a read command are sequentially stored in the reserve block area 202, beginning with reserve data block 0 and reserve data block F. When a read response is returned, the controller 106 reads block data from reserve data block 0 and adds the block data to the read response, while performing the data transmission process at the same time.

Figure 3:
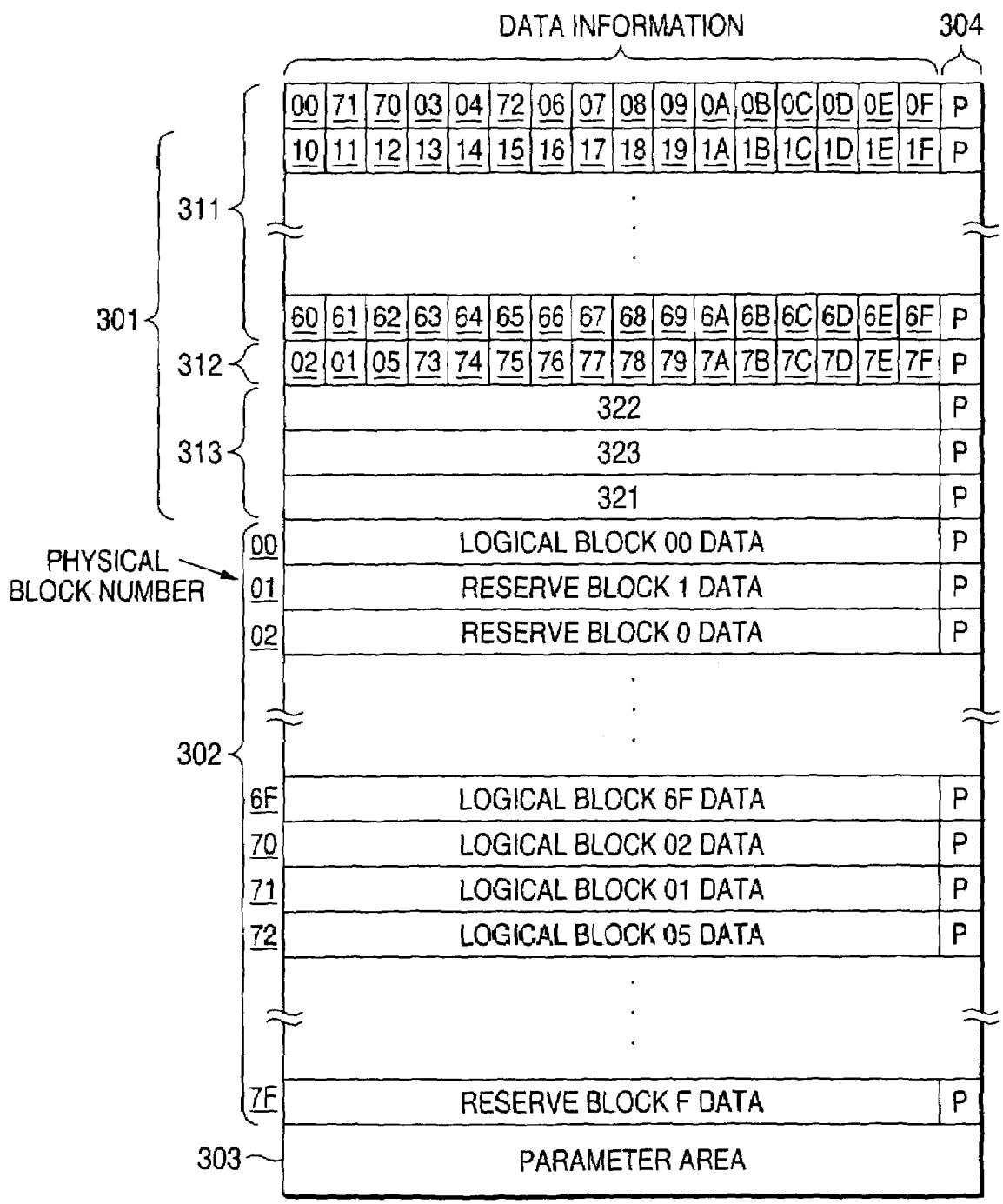
FIG. 3 is a diagram showing a memory structure in a physical memory space according to the embodiment.

The nonvolatile memory 109, in the physical memory space, has the file structure shown in FIG. 3, the actual memory structure. Included in the physical memory space are an address management area 301 and a data area 302. And in the address management area 301, there is a data block address management area 311 for managing the block numbers of logical data blocks, a reserve block address management area 312 for managing the block numbers of reserve data blocks, and a block number holding area 313 for recording block numbers when the process for writing or reading block data is performed. Further, for the nonvolatile memory 109, a parameter area 303 is also provided for storing various parameters, including writing-in-progress information and reading-in-progress information used for data updating.

The data blocks in the data block area 201 and the reserve block area 203 in the logical memory space in FIG. 2 are correlated with each other, in the physical memory space in FIG. 3, by the block numbers in the address management area 301, and these data blocks are stored in the data area 302, where they coexist. The logical data blocks in the data block area 201 are correlated with each other, in the physical memory space in FIG. 3, by the block numbers in the data block address management area 311 in the address management area 301, and these data blocks are stored in the data area 302. Similarly, the reserve data blocks in the reserve block area 202 in the logical memory space in FIG. 2 are correlated in the physical memory space in FIG. 3 by using the block numbers in the reserve block address management area 312 in the address management area 301, and these data blocks are stored in the data area 302.

The block number holding area 313 has a logical block number holding area 321 for holding a logical block number designated by a command for the block data writing/reading process, a physical block number holding area 322 for holding a physical block number that corresponds to the designated logical block number, and a reserve block number holding area 323 for holding a reserve block number whereat are stored write data to be added to a response packet for the writing process and read data added to a response packet for the reading process. Also, error check data (parity data) 304 are stored for each data block in order to determine or confirm whether the values of the block data in the nonvolatile memory 109 are correct.

While referring to FIG. 4, an explanation will now be given for the structures of the address management area 301, and the contents of the control process.

Figure 4:
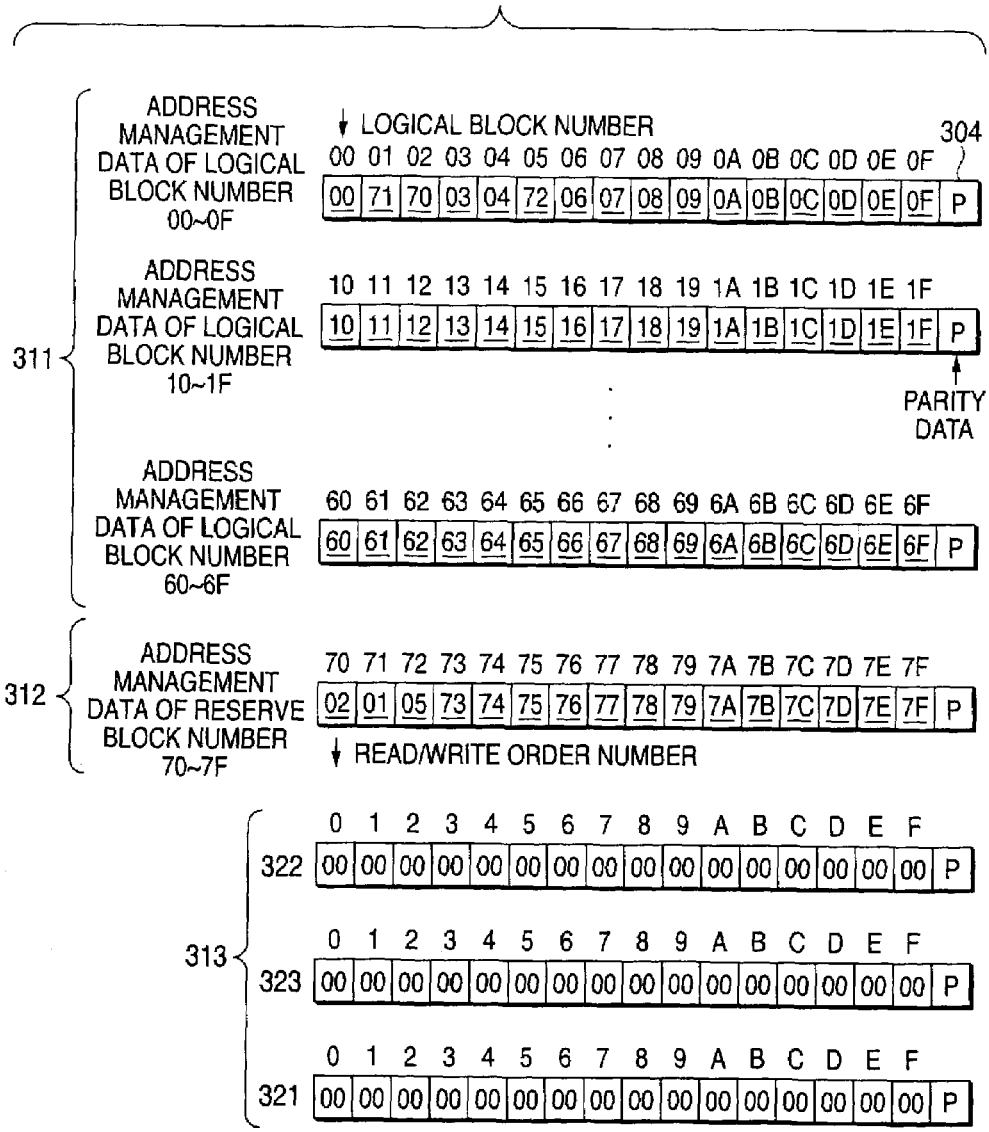
FIG. 4 is a diagram showing an address management area in the physical memory space according to the embodiment.

The physical block numbers that correspond to logical block numbers 00, 01, . . . 6F are stored in the named order in the data block address management area 311 in FIG. 4. In FIG. 4, since physical block number 00 is stored in consonance with logical block number 00 in the data block address management area 311, logical data block 00, which is stored at logical block number 00 in the logical memory space, is stored at physical block number 00 in the physical memory space. Similarly, since physical block number 71 is stored in consonance with logical block number 01, logical data block 01, which is stored at logical block number 01 in the logical memory space, is stored at physical block number 71 in the physical memory space.

Further, physical block number 02 corresponding to logical block number 70 is stored in the reserve block address management area 312, as in the same manner as explained with respect to the data block address management area 311. Therefore, reserve data block 0, which is stored at logical block number 70 in the logical memory space, is stored at physical block number 02 in the physical memory space.

In this embodiment, 16 logical block numbers can be stored in the logical block holding area 321, and designated logical block numbers are stored in accordance with the number of data blocks to be written or read, and in the data writing or the reading order. It should be noted that the number of blocks that can be stored in the logical block number holding area 321 is not limited to 16.

Similarly, 16 physical block numbers can be stored in the physical block number holding area 322. In accordance with the number of data blocks to be written or read, and the writing or reading order, physical block numbers correlated in the address management area 301 are stored in the physical block number holding area 322. It should also be noted that the number of blocks that can be stored in the physical block number holding area 322 is not limited to 16.

Further, 16 reserve block numbers can be stored in the reserve block number holding area 323. In accordance with the number of data blocks to be written or read and the writing or reading order, physical block numbers are stored sequentially, beginning with the first number, in the reserve block number holding area 323, in correlation with the logical block numbers in the reserve block area 202 in the logical memory space, where block data added to a write command or block data to be added to a read response are stored. It should also be noted that the number of blocks that can be held in the reserve block number holding area 323 is not limited to 16.

Since the logical block numbers, the physical block numbers and the reserve block numbers are held in this manner, even when the data writing process or the data reading process is interrupted when the power is cut off, the data state at the point at which the process was interrupted, or the original state, can be easily recovered, and the occurrence of a data error can be prevented.

Figure 5:
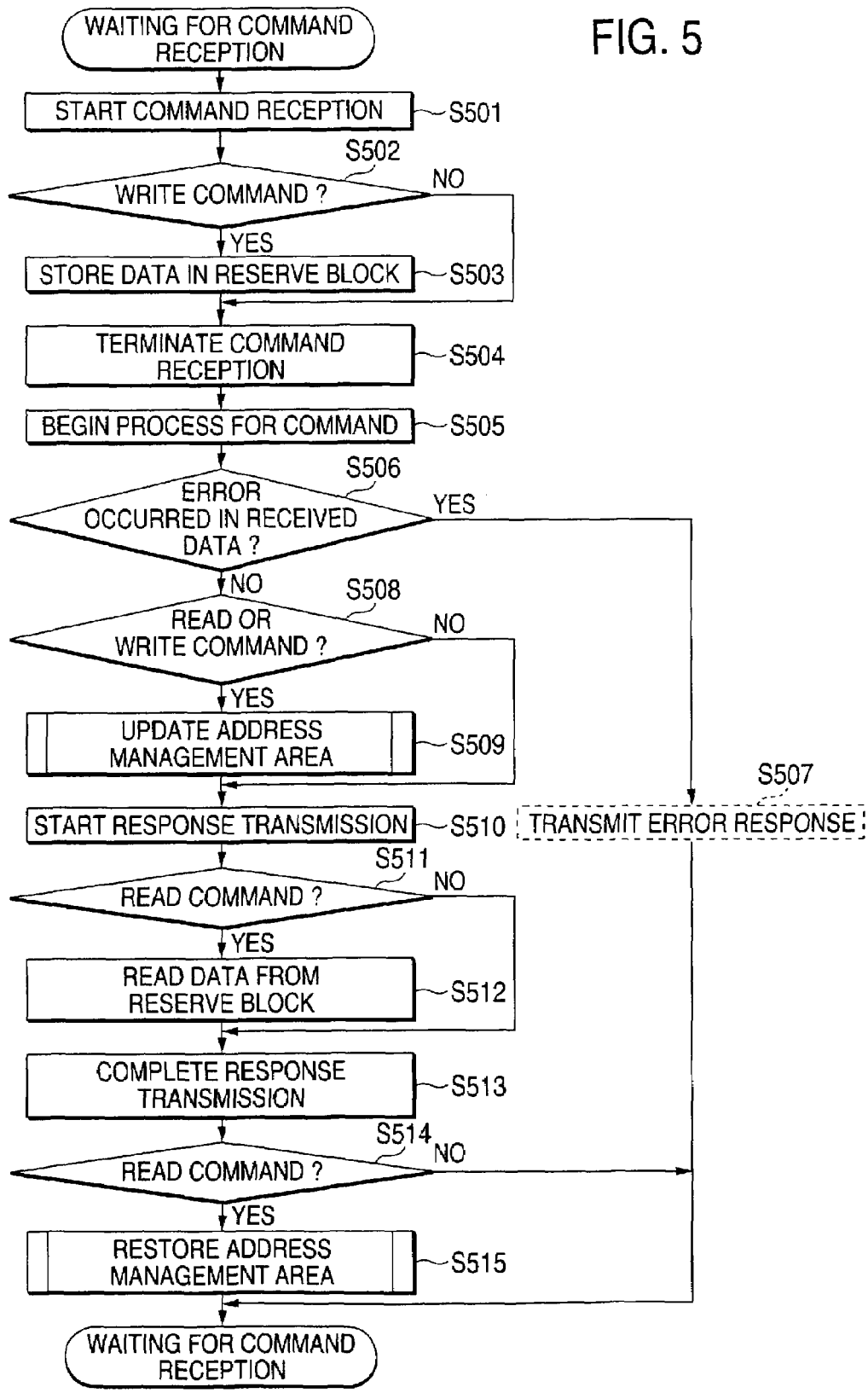
FIG. 5 is a flowchart showing the data processing for the embodiment.

The command processing for this embodiment will now be described while referring to the flowchart in FIG. 5.

When the reception of a command from the reader/writer 102 is started (step S501), the IC card 101 examines the type of received command (step S502). If the command is a write command, block data that are added to the command are stored in a reserve block area, while command reception is continued (step S503). At this time, block data to be written is stored in the block data at the physical block number indicated in the reserve block address management area. If the received command is not a write command, the process at step S503 is skipped. Then, command reception is completed (step S504) and a process corresponding to a command is performed (step S505). When, as the result of another confirmation performed for the received data (step S506), an error due to a transmission failure or an abnormality in a designated parameter is found, either an error response is transmitted (step S507) and program control is shifted to a command waiting state, or program control is shifted to the command waiting state without an error response being transmitted.

When the individual process can be normally performed, the type of received command is determined (step S508), and when a received command is neither a write command nor a read command, transmission of a response is started (step S510). Then, when the response has been transmitted (step S513), program control is shifted to a command waiting state. When the received command is a write command, the address management area corresponding to the write command is updated (step S509). Thereafter, the transmission of a response is begun (step S510), and after the response transmission has been completed (step S513), program control is shifted to the command waiting state. When the received command is a read command, the address management area corresponding to the read command is updated (step S509). Thereafter, the transmission of a response is started (step S510), block data are read from the reserve block that has been rewritten through the updating process, and a response is transmitted (steps S511 and S512). When the transmission of the response has been completed (step S513), and the address management area has been restored (step S514 and S515), program control is shifted to the command waiting state.

While referring to FIG. 4 and the flowchart in FIG. 6, an explanation will now be given for the address management area updating process performed, in this embodiment, at step S509 in FIG. 5 upon the reception of a write command for the writing of two data blocks in the order in which logical block numbers 01 and 00 are arranged in the physical memory structure in FIG. 3.

As is shown in FIG. 3, before the writing process is performed, 02 and 01 are the physical block numbers for the first and second blocks in the reserve block address management area 312. Therefore, when at step S503 data are stored in the reserve blocks, block data for the first block, designated by logical block number 01, are stored at physical block number 02, and block data for the second block, designated by logical block number 00, are stored at physical block number 01.

Figure 6:
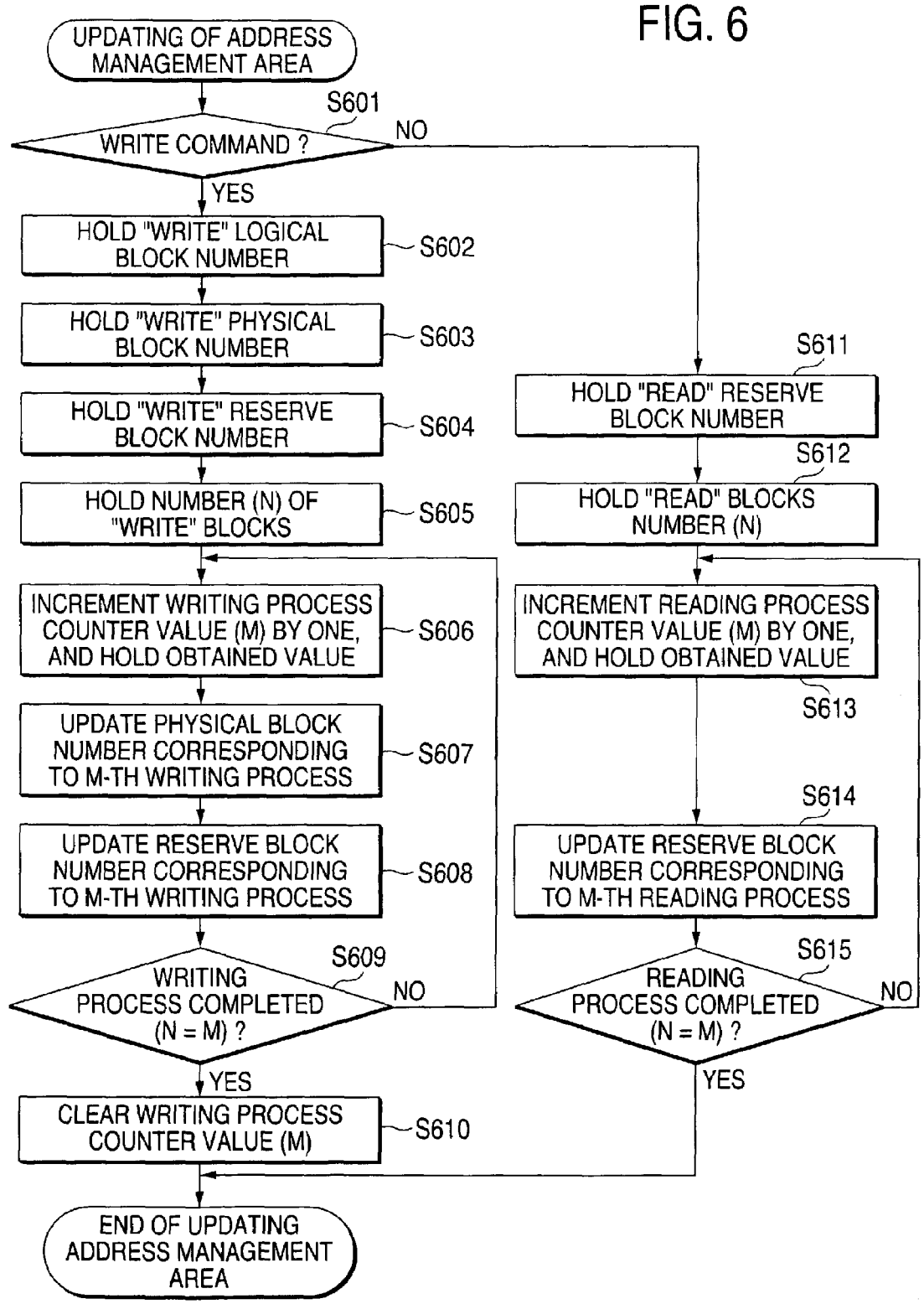
FIG. 6 is a flowchart showing the processing for updating an address management area according to the embodiment.

During the process at step S509 for updating the address management area, first, as is shown in FIG. 6, a check is performed to determine whether the process is for a write command or a read command (step S601). When the process is for a write command, logical block numbers are held (step S602). In this embodiment, the designated logical block numbers, 01 and 0, are recorded in the named order in the logical block number holding area 321 in FIG. 4. Thereafter, the physical block numbers are held (step S603). The physical block numbers 71 and 00, which correspond to the designated logical block numbers 01 and 00, are recorded in the named order in the physical block number holding area 322. Further, the reserve block numbers are stored (step S604). As is described above, since 02 and 01 are physical numbers in the reserve block address management area 312, these physical block numbers are stored in the reserve block number holding area 323 in FIG. 4. Furthermore, the number of "write" blocks (N=2) (corresponds to the number of written blocks and the total number of updated blocks) is stored in the parameter area 303 of the nonvolatile memory 109 (step S605).

Next, the writing process count value (M=0) (corresponds to the number of updated blocks) is-incremented-by one, and the obtained value (M=1) is stored in the parameter area 303 of the nonvolatile memory 109 (step S606). Then, the physical block number corresponding to the M-th (M=1) writing process is updated (step S607). In this embodiment, physical block number 71, which corresponds to the first logical block number 01 in the data block address management area 311 in FIG. 4, is updated by writing thereto physical block number 02 for the corresponding first reserve block. Furthermore, the reserve block number corresponding to the M-th (M=1) writing process is updated (step S608). In this case, physical block number 71, for the first data block, is written in place of the corresponding first physical block number 02 in the reserve block address management area 312, and the physical block numbers of the data block and the reserve block are rewritten and mutually exchanged.

Figure 7:
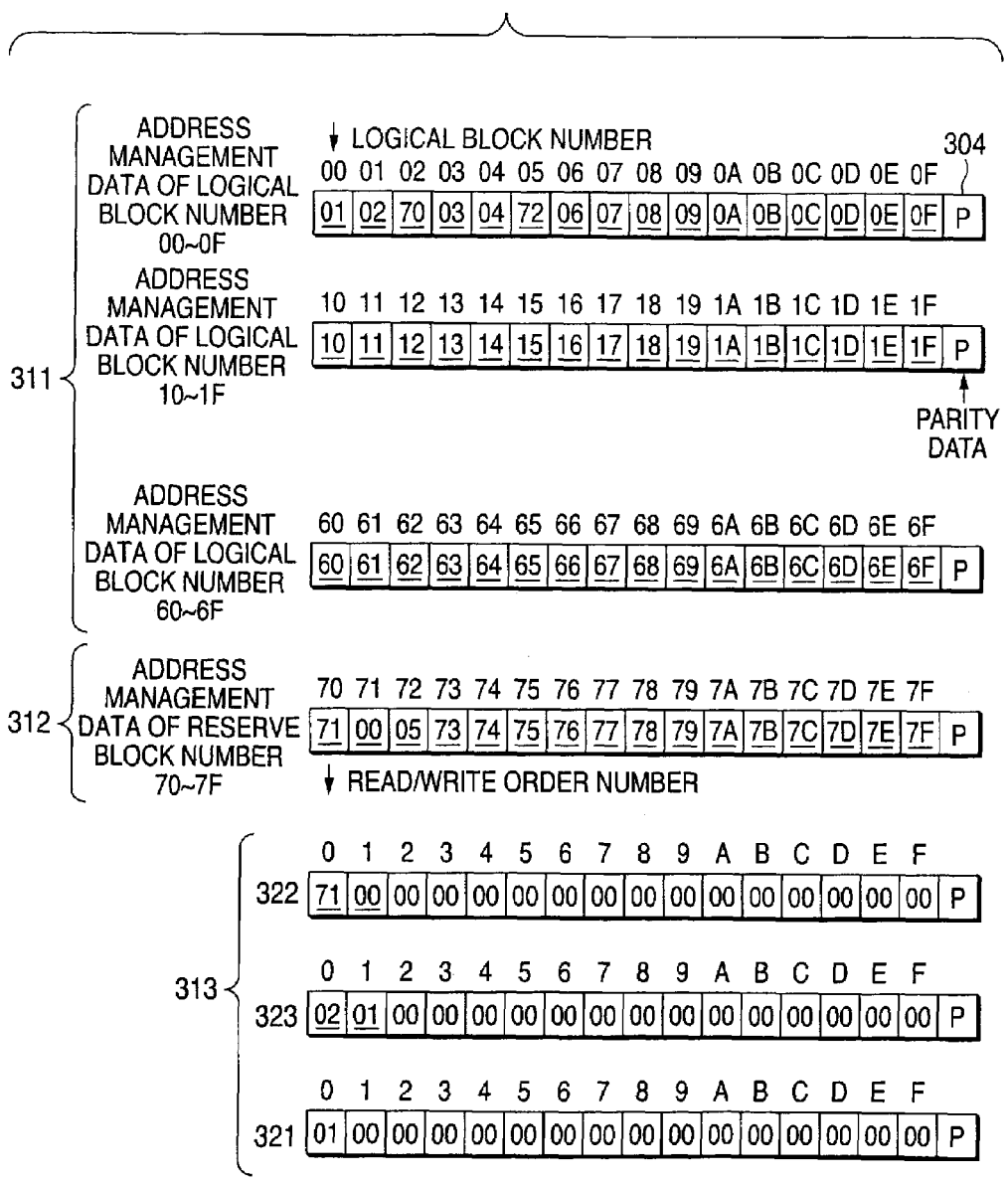
FIG. 7 is a diagram showing the structure, after the writing process is completed, of the address management area in the physical memory space according to the embodiment.
Figure 8:
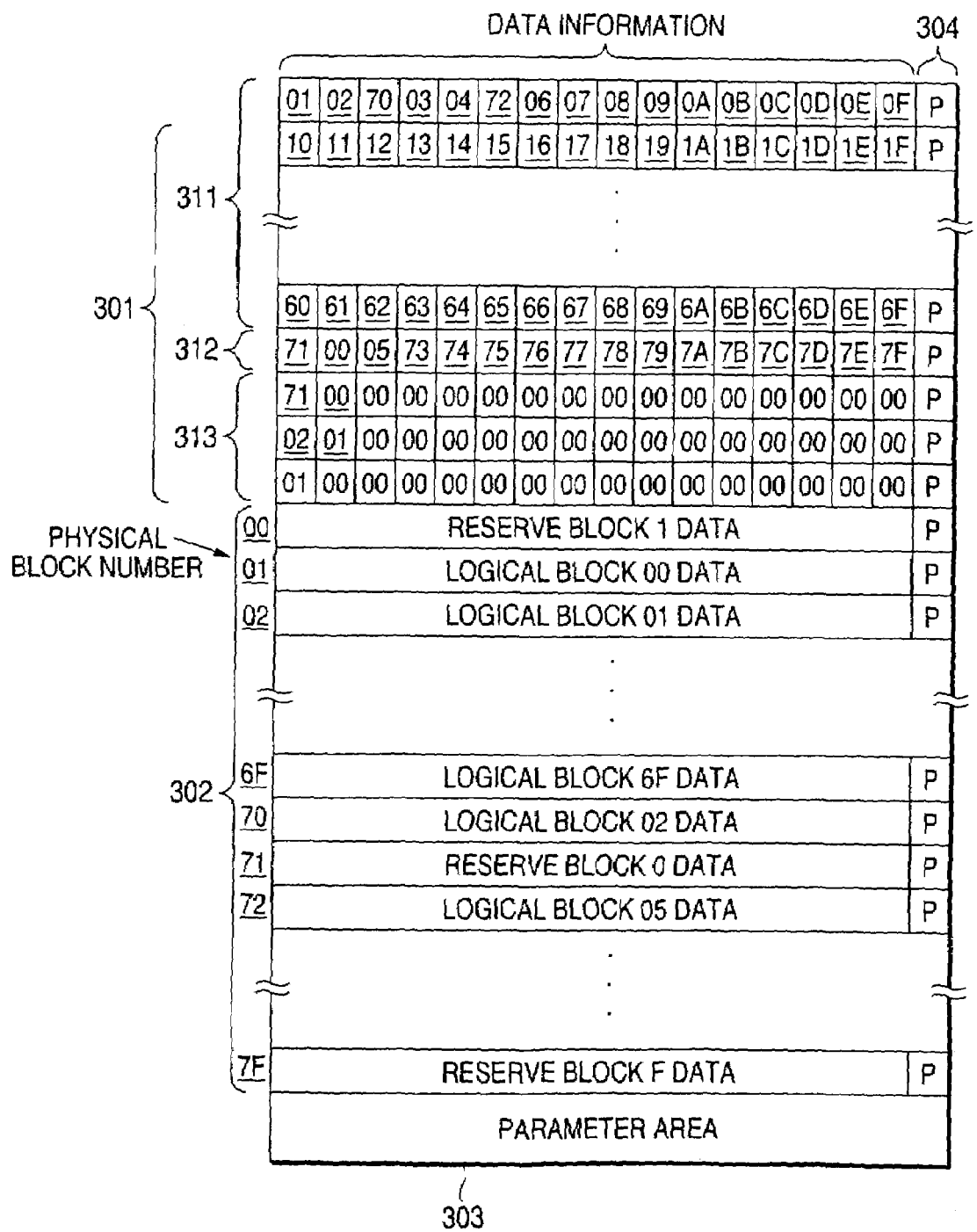
FIG. 8 is a diagram showing the memory structure in the physical memory space after the writing process is performed for this embodiment.

Thereafter, the writing-in-progress information obtained based on the number of "write" blocks and the writing process counter value are examined to determine whether the writing process has been completed (N=M) (step S609). When the writing process has not yet been completed, program control returns to step S606 and the writing process counter value is incremented by one. Further, the physical block numbers of the second data block and the second reserve block are rewritten and mutually exchanged (steps S606 to S608). When the writing process has been completed, the writing process counter value is cleared (M=0) (step S610) and the updating of the address management area 301 is terminated. The memory structure in the state wherein the writing process has been completed is shown in FIGS. 7 and 8.

The processing at step S509 performed to update the address management area corresponds to the processing performed to write block data. Specifically, the block data to be-written by write commands are temporarily stored in the reserve blocks, and the block numbers are rewritten to be exchanged, in the address management area, between the logical block numbers designated by the write commands and the reserve blocks. As a result, the block data writing process can be completed, and the process for updating the block numbers in the address management area can be performed more rapidly than is possible with the conventional block data writing process.

Further, in this embodiment, 70 to 7F are fixed, logical block numbers for the reserve block areas wherein block data designated for the writing process are stored. Therefore, since the writing and reading processes are repeatedly performed for the same logic block numbers, and since the storage of the block data in the reserve block areas is performed substantially parallel to the transmission of received data, time for writing the block data is essentially not required, and the writing process speed can be increased.

When the power is cut off during the writing process, the writing process counter value (M) in the parameter area 303 of the nonvolatile memory 109 is not cleared ($\neq 0$) because the writing process has not been completed. Therefore, the writing process counter value (M) is examined when the power is restored, so that whether the power was cut off during the writing process can be determined.

Figure 9:
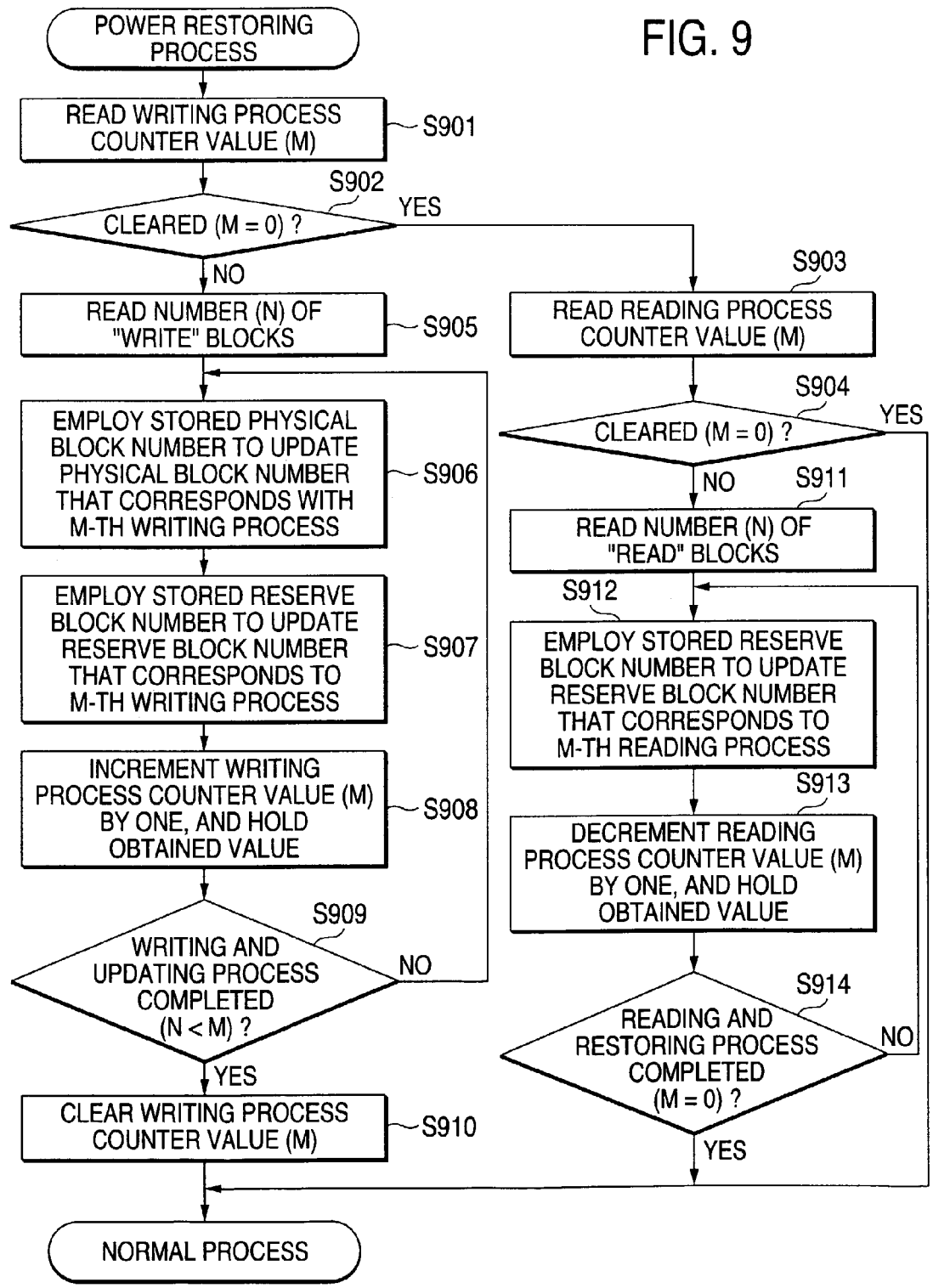
FIG. 9 is a flowchart showing the processing performed according to the embodiment when power is restored.

While referring to the flowchart in FIG. 9, an explanation will now be given for the processing for restoring power after it was cut off during the writing process in this embodiment.

First, a power voltage appropriate for the operation is applied, and immediately after the operation is started, a writing process counter value (M) is read from the parameter area 303 (step S901). A check is then to determine whether the writing process counter value (M) has been cleared (M=0) (step S902). When the counter value has been cleared, it can be assumed that the power cut-off did not occur during the writing process, and the reading process counter value (M) is read (step S903). Following this, a check is performed to determine whether the reading process counter value (M) has been cleared (M=0) (step S904). When the counter value has been cleared, it can be assumed that the power cut-off did not occur during the reading process, and program control is shifted to the normal processing.

When, as the result of determination performed at step S902 for the writing process counter value (M), it is found that the power cut-off occurred during the writing process, the number of "write" blocks (M), which is the number of blocks designated to be written, is read (step S509). Thus, a block for which the physical block number was updated can be identified by referring to the writing process counter value (M). Therefore, according to the procedures for updating the physical block numbers of the data block address management area 311 during the normal writing process, the physical block number for the M-th reserve block is written to the physical block number corresponding to the logical block number of the M-th designated logical block number holding area 321 (step S906). Further, according to the procedures employed during the normal writing process to update the physical block numbers for the reserve bock address management area 312, the physical block number of the M-th data block is written to the M-th physical block number of the designated reserve block address management area 312, and the physical block numbers in the data block and reserve block are rewritten and mutually exchanged (step S907).

Thereafter, the writing process counter value (M) is incremented by one, and the obtained value is held in the parameter area 303 of the nonvolatile memory 109 (step S908). Then, the updated writing process counter value (M) is compared with the number of "write" blocks (N). When the writing process counter value (M) is equal to or smaller than the number of "write" blocks (N$\geq$M), i.e., when the writing and updating process has not been completed, program control returns to step S906, the physical block numbers of the second data block and the reserve block are rewritten and mutually exchanged, and the writing process counter value is incremented by one (steps S906 to S908). When the writing process has been completed (N<M), the writing process counter value is cleared (M=0) (step S910), and program control is shifted to the normal process.

Through this processing, protection of data is ensured when power is cut off. Further, during this process, since instead of returning to the original state, the state of the memory can always be set to one wherein the writing process has been completed, the processing efficiency is increased. In this embodiment, once power has been restored following a power cut-off, the writing process is performed from the block number whereat the writing was interrupted to the last block number. The writing process may be performed from the first block number to the last, however, it is preferable that it be performed beginning at the block whereat the writing was interrupted, because the processing time can be reduced.

While referring to FIG. 4 and the flowchart in FIG. 6, an explanation will now be given for the address management area updating process performed, in this embodiment, at step S509 in FIG. 5 upon the reception of a read command for the reading of two data blocks in the order, the logical block numbers 01 and 00, assuming the physical memory structure in FIG. 3.

During the process performed at step S509 for updating the address management area, as is shown in FIG. 6, a check is performed to determine whether a write command process or a read command process should be performed (step S601). When a read command process is to be performed, the reserve block numbers are held (step S611). In this embodiment, since in the reserve block address management area, 02 and 01 are physical block numbers, these block numbers are stored in the reserve block number holding area 323 in FIG. 4. Further, the number of "read" blocks (N=2) (corresponds to the number of blocks to be read or the total number of blocks to be restored) is held in the parameter area 303 of the nonvolatile memory 109 (step S612).

Thereafter, the reading process counter value (M=0) (corresponds to the number of restored blocks) is incremented by one and the obtained value (M=1) is stored in the parameter area 303 of the nonvolatile memory 109 (step S613). In addition, the reserve block number corresponding to the M-th (M=1) reading process is updated (step S614). Physical block number 71 of the first data block area is then written in place of the corresponding first physical block number 02 of the reserve block address management area 312 in FIG. 4, and the address management area 312 is updated. Thereafter, the reading-in-progress information obtained by referring to the number of "read" blocks and the reading process counter value are examined to determine whether the reading process has been completed (N=M) (step S615). When the reading process has not yet been completed, program control returns to step S613, whereat the reading process counter value is incremented by one and the processing performed to rewrite the physical block number of the second reserve block is repeated (steps S613 and S614). When, however, the reading process has been completed (step S615), the updating of the address management area is terminated.

The writing process counter value (M) may also serve as the reading process counter value (M), and the number of "write" blocks (N) may also serve as the number of "read" blocks (N), or alternately, separate numbers may be provided.

The transmission of a read response is started after the updating of the address management area has been completed. Block data to be read, which are added to the read response, are the block data that have the physical block numbers designated in the reserve block address management area 312, and data blocks equivalent in number to the "read" blocks are read, beginning with reserve data block 0, and transmitted with the read response.

While referring to the flowchart in FIG. 10, an explanation will now be given for the process performed, in this embodiment, at step S515 in FIG. 5 to restore the address management area after the response has been transmitted.

Figure 10:
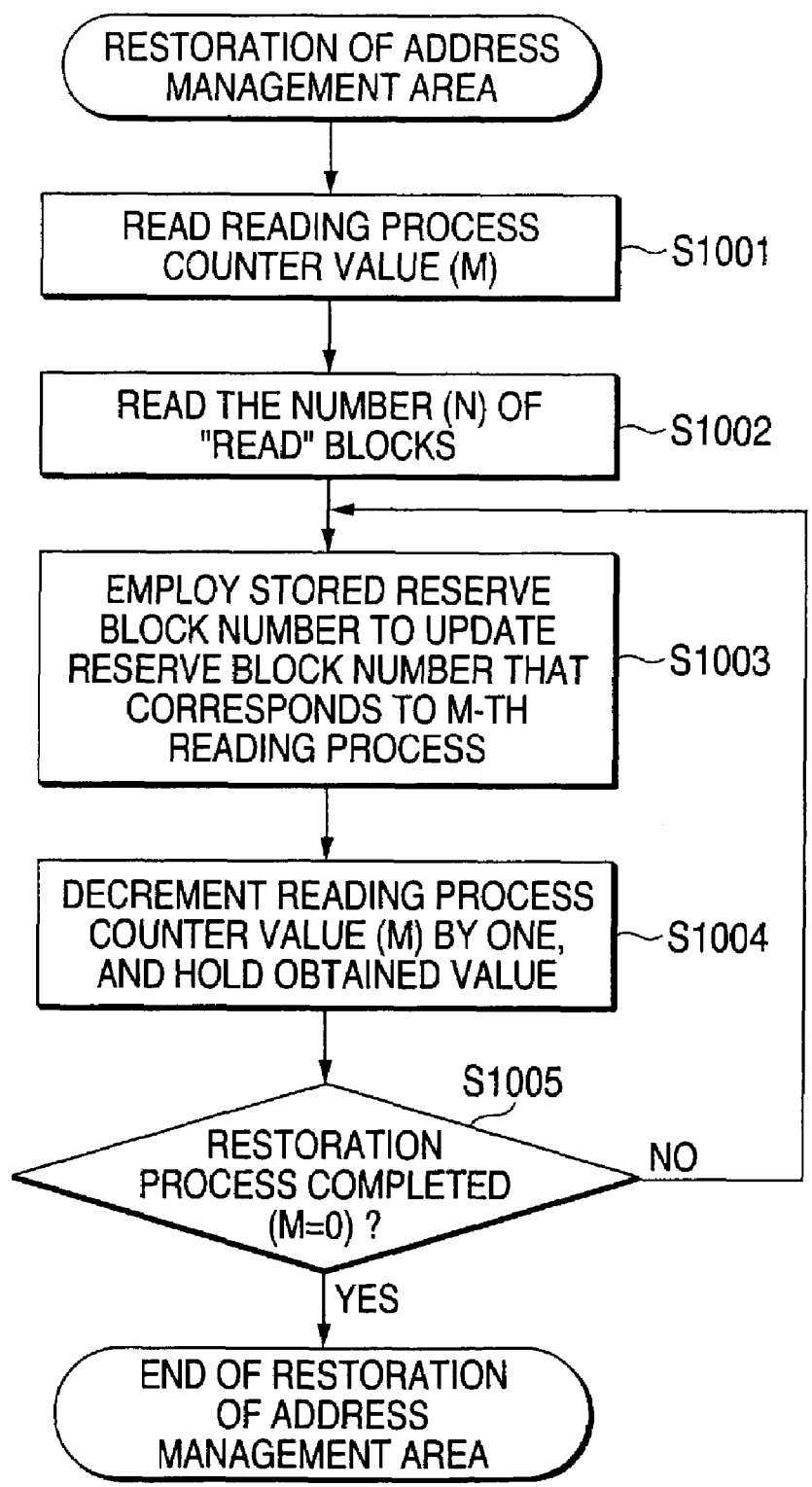
FIG. 10 is a flowchart showing the processing performed according to the embodiment for restoring the address management area.

During the process performed at step S515 to restore the address management area, as is shown in FIG. 10, first, the reading process counter value (M) is read (step S1001), and the number (N) of "read" blocks designated by a read command is read (step S1002). In this example, M=2 and N=2. Following this, the physical block number in the reserve block address management area 312 corresponding to the M-th reading process is updated by using the M-th physical block number in the reserve block number holding area 323 (step S1003). Then, the reading process counter (M=2) is decremented by one, and the obtained value is stored in the parameter area 303 of the nonvolatile memory 109 (step S1004).

Thereafter, a check is performed to determine whether the process for restoring the address management area has been completed (M=0) (step S1005). When the restoration process has not yet been completed, program control is returned to step S1003, whereat the physical block number of the second reserve block is rewritten, and the reading process counter value (M) is decremented by one (step S1004). When the reading process has been completed, the processing performed to restore the address management area is terminated. Through this processing, the physical block numbers of the reserve block address management area 312 are returned to the state existing before the read command was received.

The process at step 509 for updating the address management area and the process at step S515 for restoring the address management area correspond to the process for reading block data. Specifically, in the address management area, the block numbers are rewritten so as to exchange a logical block designated by the read command for a reserve block, and block data are read from the reserve block. Thereafter, the reserve block and the logical block are returned to their original states by rewriting their block numbers, and the process for reading block data is completed. The process for updating the block numbers in the address management area and the process for restoring them can be performed more rapidly than can the conventional block data reading process.

Furthermore, in this embodiment, since 70 to 7F are fixed, logical block numbers for the reserve block area wherein block data designated for the reading process are stored, the data writing and reading is always performed for the same logical block number. Furthermore, since the reading of the block data from the reserve block area is performed substantially parallel to the data transmission process, essentially, time for reading the block data is not required, and the reading process speed can be increased.

When power is cut off during the reading process, the reading process is incomplete and the reading process counter value (M), stored in the parameter area 303 of the nonvolatile memory 109, is not cleared (≠0). Therefore, when power is restored, whether the power cut-off occurred during the reading process can be ascertained by examining the reading process counter value (M).

While referring to the flowchart in FIG. 9, an explanation will now be given for the process performed in this embodiment to restore power after it was cut off during the reading process.

First, an appropriate power voltage for the operation is applied, and immediately after the operation is initiated, the writing process counter value (M) is read from the parameter area 303 (step S901). A check is then performed to determine whether the writing process counter value (M) has been cleared (M=0) (step S902). When the counter value (M) has been cleared, it can be assumed that the power cut-off did not occur during the writing process, and the reading process counter value (M) is read (step S903). Following this, a check is performed to determine whether the reading process counter value (M) has been cleared (M=0) (step S904). When the counter value (M) has been cleared, it can be assumed that the power cut-off did not occur during the reading process, and program control is shifted to the normal process.

When, as the result of the determination performed for the reading process counter value (M) at step 903, it is ascertained that the power cut-off occurred during the reading process, the number (N) of "read" blocks, which is the number of blocks designated for reading, is read (step S911). At this time, a reserve block area for which the physical block number has been updated can be identified by examining the value of the reading process counter value (M) and the number (N) of "read" blocks. Therefore, by using the procedures employed to update the physical block numbers in the reserve block address management area 312 during the normal reading process, the physical block number of the designated M-th reserve block address management area 312 can be updated by using the M-th physical block number in the reserve block number holding area 323 (step S912). Then, the reading process counter value (M) is decremented by one, and the obtained value is stored in the parameter area 303 of the nonvolatile memory 109 (step S913).

Thereafter, a check is performed to determine whether the process for restoring the address management area has been completed (M=0) (step S914). When the restoration process has not yet been completed, program control returns to step S912, whereat the physical block number in the address management area 312 for the next reserve block is rewritten, and the reading process counter value (M) is decremented by one (step S913). When, however, the reading process has been completed, program control is shifted to the normal process.

Through this processing, the protection of data is ensured when power is cut off. In this embodiment, once power has been restored following a power cut-off, the reading and restoration processes are performed from the block number whereat the reading process was interrupted to the first block number. The reading and restoration processes may be performed from the last block number to the first block number, however, it is preferable that they be performed beginning with the block whereat the reading process was interrupted, because the processing time can be reduced.

As is shown in FIG. 3, the error check data 304 are added to each data block, and during the writing process, error check data must be calculated and updated to store a data block that is to be written. In this embodiment, upon receiving a write command, the storage of the block data that are to be written and stored as reserve block data in the reserve block area is performed substantially parallel to the data transmission process, and the data are established as block data at this time. Therefore, when during the command reception process the reserve block data are stored and the error check data are calculated and updated substantially at the same time, the block data can be stored in the nonvolatile memory 109. That is, since the error check data for the block data are also updated within the time required for the command reception process, unlike in the conventional case, the updating of the error check data is not a separate process that must be performed in addition to the command reception process, and the processing time can be reduced.

Further, during the reading process, in order to determine whether block data to be read are correct, the error check data must be calculated for the block data that are read, and the obtained error check data must be compared with the error check data that are stored during the writing process. In this embodiment, however, since during the data transmission process block data to be read are stored as reserve block data in the reserve block area, during the transmission of a read response the error check data can be calculated while the reserve block data is read, and the obtained error check data can be compared with the error check data stored during the writing process.

Figure 11:
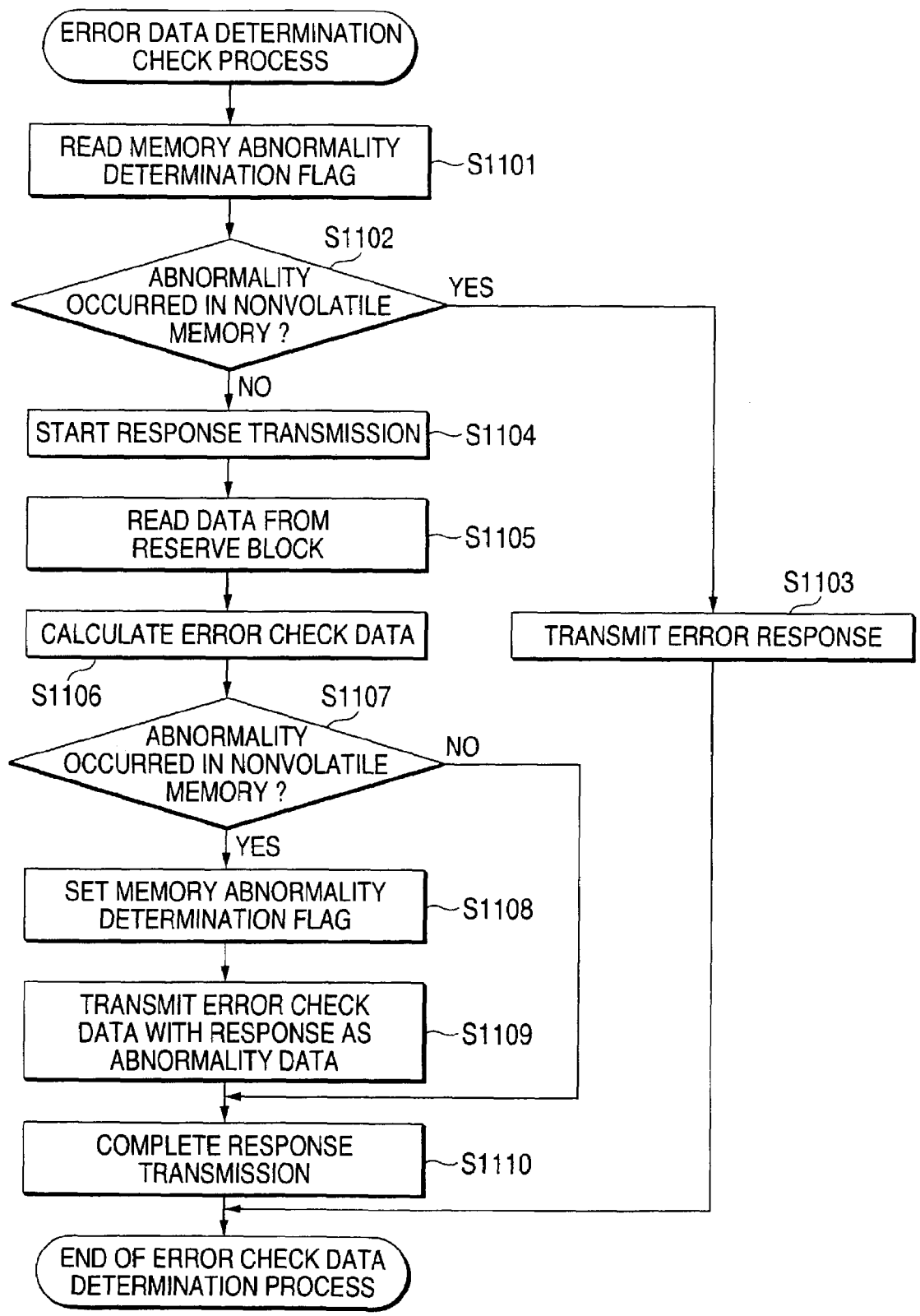
FIG. 11 is a flowchart showing the error check data determination processing performed for this embodiment.
Figure 12:
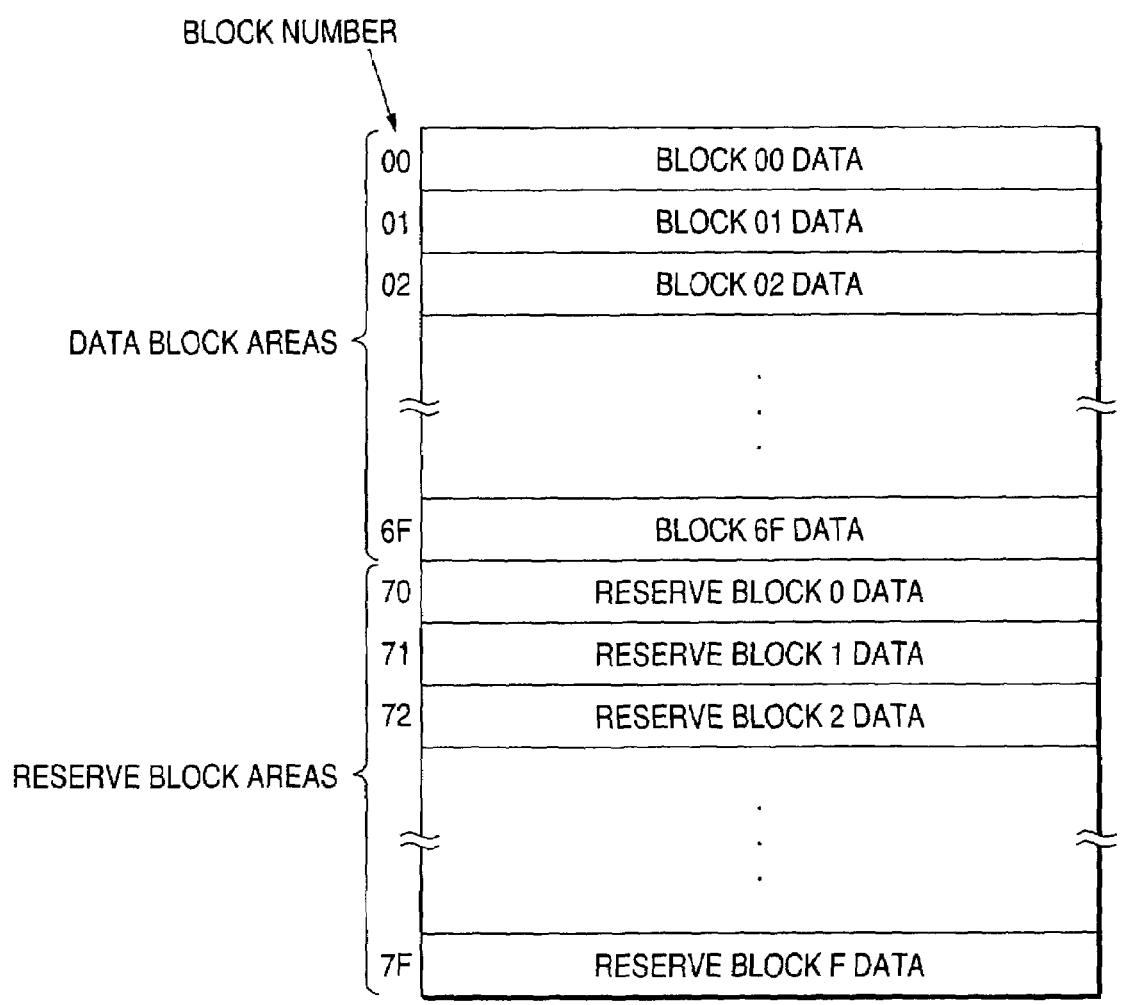
FIG. 12 is a diagram showing the memory structure in physical memory space according to a first conventional example.
Figure 13:
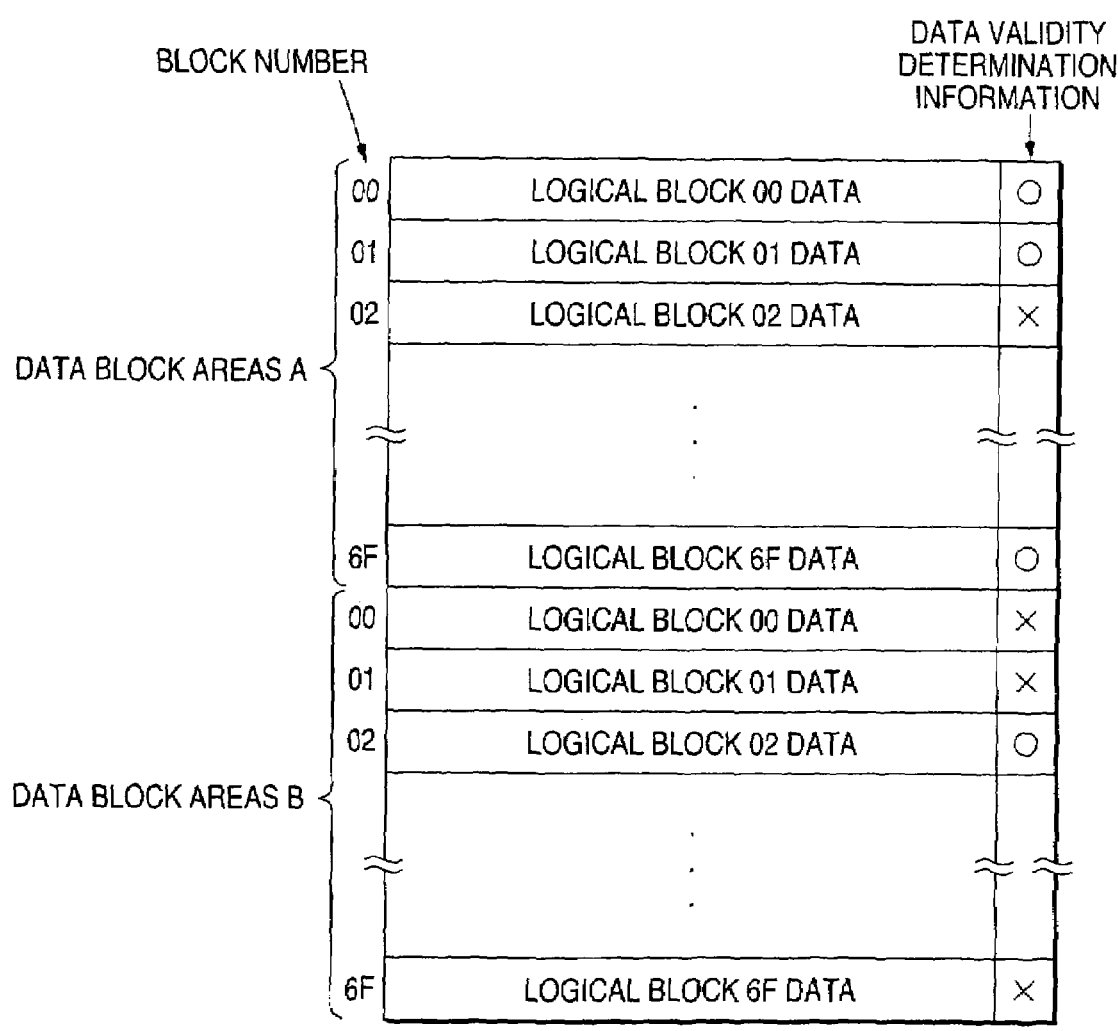
FIG. 13 is a diagram showing the memory structure in physical memory space according to a second conventional example.

While referring to the flowchart in FIG. 11, an explanation will now be given for the data error determination processing performed during the reading process for this embodiment.

First, during the reading process, a memory abnormality determination flag is read from the parameter area 303 of the nonvolatile memory 109 (step S1101), and a check is performed to determine whether an abnormality occurred in the nonvolatile memory 109 the previous time (step S1102). When it is ascertained that an abnormality occurred, an error response, including error information, is transmitted (step S103).

When no abnormality occurred, the normal reading process is performed, and transmission of a response is begun (step S1104). Block data are read from the reserve block area (step S1105), and at the same time, the error check data are calculated (step S1106). Thereafter, the results of the calculation of the error check data are employed to determine whether there is an abnormality in the nonvolatile memory 109 (step S1107). When an abnormality is found in the nonvolatile memory 109, the memory abnormality determination flag is set (step S1108) and a response is transmitted to which transmission error check data, such as a CRC code, have been added as abnormality data (step S1109). When no abnormality is found in the nonvolatile memory 109 at step S1107, a normal response is transmitted.

When an abnormality is found in the nonvolatile memory 109, and the transmission of a response to which transmission error check data was added as abnormality data has been completed (step S1110), the reader/writer 102, upon receiving this response, assumes a transmission error has occurred and, generally, repeats its previous transmission.

When, thereafter, the IC card 101 again receives a read command, and when at step S1101 the memory abnormality determination flag is read, at step S1102 it can be ascertained that the abnormality occurred the previous time. Thus, at step S1103 an error response including error information is transmitted.

Through this processing, when an abnormality has occurred in the nonvolatile memory 109, the processing load is increased because a transmission must be repeated However, for a normal process during which the nonvolatile memory 109 is also normal, the error checking of block data to be read can be performed at the same time as a response is being transmitted. Unlike in the conventional case, the time for error checking is not required in addition to the time required for the transmission of a response, and the processing can be performed quickly.

In this embodiment, when data is to be read from or written to the IC card 101 by the reader/writer 102, the reader/writer 102 designates a logical block number, and in the IC card 101, the logical block number is converted into a physical block number using the address management area. However, a physical block number may also be directly designated by switching between the access control methods used, so that the data reading and writing processes can be performed.

For switching between the access control methods, an access control switching command is transmitted to the IC card 101 by the reader/writer 102, and upon receiving the access control switching command, the controller 106 of the IC card 101 changes the access method to the method designated for the nonvolatile memory 109. Thus, since the data reading and writing processes can be performed while the physical block number is directly designated, the block number whereat a failure has occurred can be easily identified for memory checking, and the checking efficiency is increased.

As is described above, according to the embodiment, even when power is cut off during a block data reading or writing process, the original state can be easily recovered because address data acquired before the reading or writing is begun can be maintained, and the safety of the data is guaranteed by the protection afforded by the memory. Further, when power is restored, the reading or writing of data can be completed up to the end of the data.

During the writing process, at the same time as the command reception process is performed whereby a command packet is transmitted, block data and error check data can be written to the memory, so that the processing speed is increased. In addition, since once block data are written to the reserve block area of the nonvolatile memory and can be used directly as real data, it is not necessary for received data to be temporarily written to the reserve block area and to then be written to the data block area. Therefore, since as writing processing time only that needed to update address data is required, the processing time can be reduced. In this embodiment, a considerable increase in processing speed can be realized when received data are written to nonvolatile memory such as FeRAM, for which the writing speed is especially fast.

Further, since during the reading process, performed at the same time as the response transmission process for transmitting response packets, block data can be read from the memory and data error determination, using error check data, can be performed, the processing speed can also be increased. Furthermore, the block data that is stored in the reserve block area, by changing the address data, can be read directly as real data, and the address data can be returned to its original state thereafter. Thus, it is not necessary for data that has been read to be temporarily written to a reserve block area before being transmitted, and the processing time can be reduced.

In addition, since the address management method for correlating logical addresses with physical addresses is employed, there is no need for a large amount of data to be held in the nonvolatile memory, and for managing the memory efficiently, only a small recording area is required. Furthermore, since the locations of the data that are received and written vary, each time data are newly written a different location is used. Also, since in the physical memory space the logical addresses of the data actually written are arranged at random, there is no persistent correlation between adjacent data, and security is improved.

According to the address management method for correlating a logical address with a physical address, so long as the total number of blocks in the data block area and the reserve block area does not exceed 256, only one block is needed to manage all the block numbers in the address management area. However, if more than 256 blocks are to be handled, a plurality of bytes, such as two or three, are required to manage the block numbers. Therefore, the chip size is increased and the memory capacity required for the address management area is expanded, e.g., is doubled or tripled.

One of other preferred embodiments in the present invention, which solves the above problem, will now be described while referring to the drawings.

Turning back to FIG. 1, it shows a block diagram showing the configuration of a non-contact IC card system for which a data processing method in the present invention is applied.

In this embodiment, when data in the nonvolatile memory 109 of the IC card are managed using blocks, the local structure of a memory having a large capacity, for which the total number of blocks is more than 256, and the data processing method therefor are provided. In this example, the total number of blocks allocated for the data block area 1401 and the reserve block area 1402 exceed 256. For this embodiment, the number of blocks allocated for the data block area 1401 is 408, and the number of blocks allocated for the reserve block area 1402 is 32. However, no limitation is imposed on the number of blocks that can be allocated.

The data block area 1401 and the reserve block area 1402 are designed so that a plurality of data blocks, each of which has a predetermined data length, e.g., 16 bytes, are stored with logical block numbers as references. In the example in FIG. 14, 480 logical data blocks represented by logical block numbers 00, 01, 02, . . . and 1DF are stored in the data block area 1401, and 32 reserve data blocks represented by logical block numbers 1E0, 1E1, . . . and 1EF are stored in the reserve block area 1402. In the explanation given for this embodiment, values, such as logical block numbers and physical block numbers, indicating the addresses of blocks in the memory, and the contents of data and flag values stored in the areas are represented by hexadecimal numbers.

Figure 14:
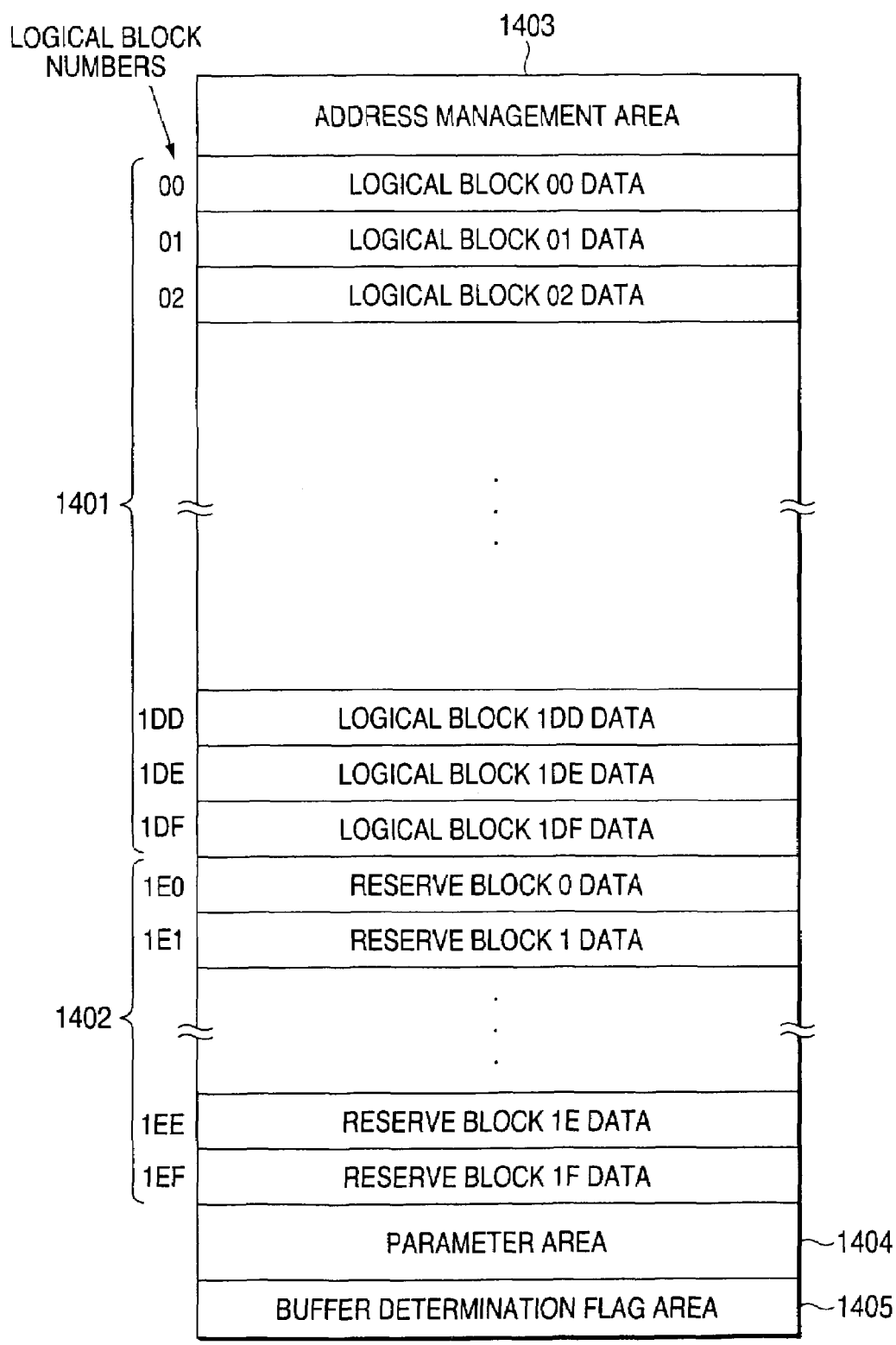
FIG. 14 is a diagram showing a memory structure in a logical memory space according to the embodiment.
Figure 15:
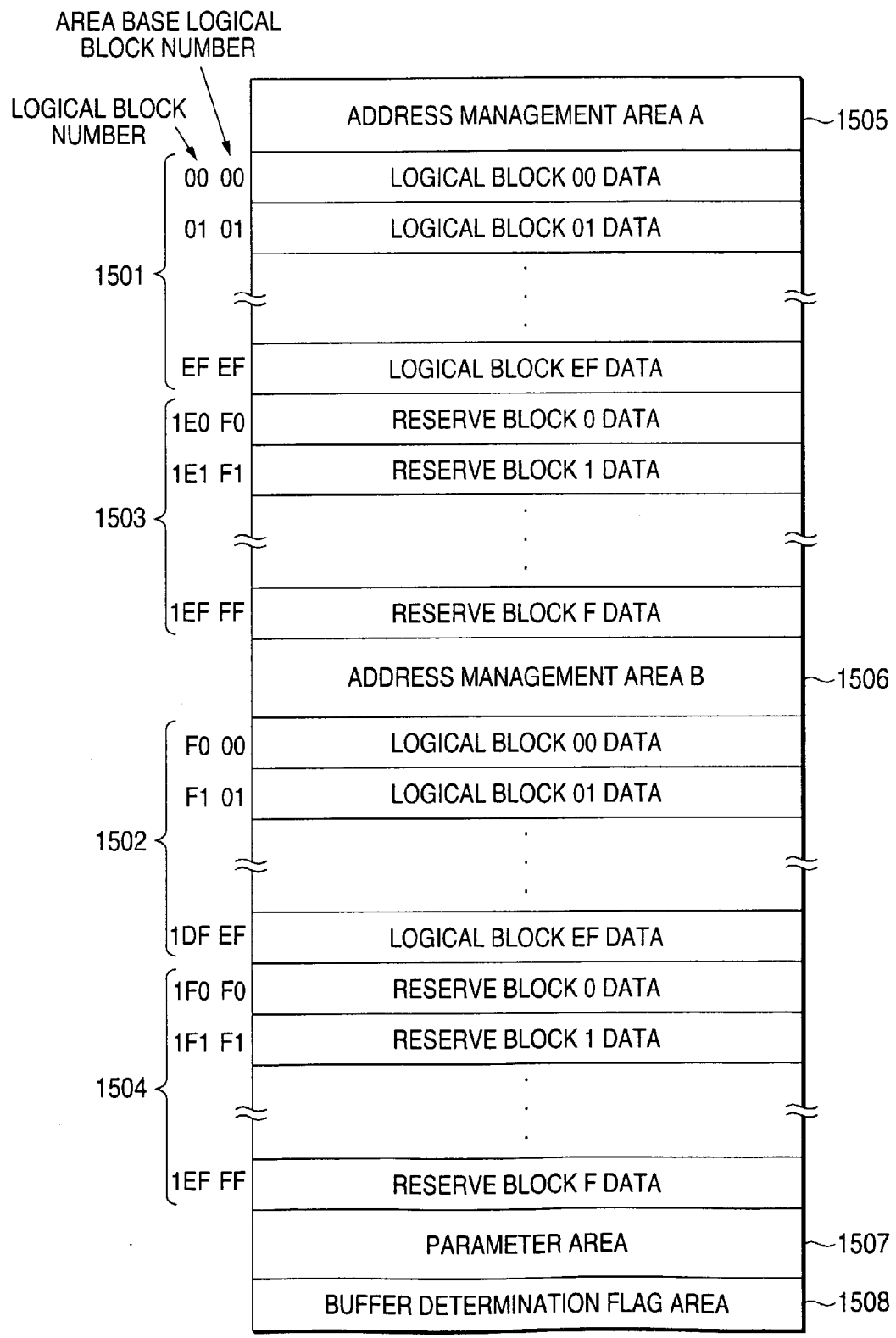
FIG. 15 is a diagram showing a memory structure obtained by area division in the logical memory space.

Since, in the block structure in FIG. 14, the number of blocks in the data block area 1401 and in the reserve block area 1402 exceeds 256, with this structure the block numbers in the address management area can not be managed using a single byte. Therefore, in this embodiment, since the number of blocks in the data block area 1401 and in the reserve block area 1402 is equal to or smaller than 256×2, as is shown in FIG. 15, the data block area is divided into two areas in the logical memory space. That is, the nonvolatile memory 109 is constituted by two data block areas A1501 and B1502, two reserve block areas A1503 and B1504, two address management areas A1505 and B1506 for storing address data that correlate the logical memory spaces of individual areas with the physical memory spaces, a parameter area 1507 and a buffer determination flag area 1508. In FIG. 15, each of the data block areas and the reserve block areas is divided into two areas; however, the areas may be divided into three or more areas, or may be divided into an appropriate number of areas in accordance with the total number of data block areas and reserve block areas.

In the block structure in FIG. 15, wherein the data blocks are managed, instead of using the logical block numbers in FIG. 14, the logical block numbers are managed by areas, which are defined for each of multiple area segments. That is, 240 logical data blocks, represented by logical block numbers 00, 01, 02, . . . and EF, are stored in the data block areas A1501 and B1502, and 16 reserve data blocks, represented by local block numbers F0, F1, . . . and FF, are stored in the reserve block areas A1503 and B1504.

The reader/writer 102 can read data from and write data to the data block areas A1501 and B1502 of the nonvolatile memory 109 contained in the IC card 101. In this case, an address management area to be updated is selected in accordance with the flag for the buffer determination flag area 1508, and the logical block number in the logical data block for which data reading/writing is to be performed is designated in the corresponding data block area A1501 or B1502, so that the data reading/writing can be performed. Multiple logical block numbers may be designated by a single command, and by designating logical block numbers by areas, 00 and 01, data reading/writing can be performed for multiple data blocks at the same time.

In the embodiment, during the data writing process, performed substantially parallel to the data transmission process, block data that are added to a write command and are designated to be written are sequentially stored in the reserve block area A1503 or B1504, beginning with reserve data block 0 up to reserve data block F. That is, when two sets of block data are written at the same time, the first designated block of data is stored in reserve data block 0, and the second designated block of data is stored in reserve data block 1.

During the data reading process, block data represented by the logical block numbers as areas that are designated by a read command are sequentially stored in the reserve block area A1503 or B1504, beginning with reserve data block 0 and reserve data block F. When a read response is returned, the controller 106 reads block data from reserve data block 0 and adds the block data to the read response, while performing the data transmission process at the same time.

Figure 16:
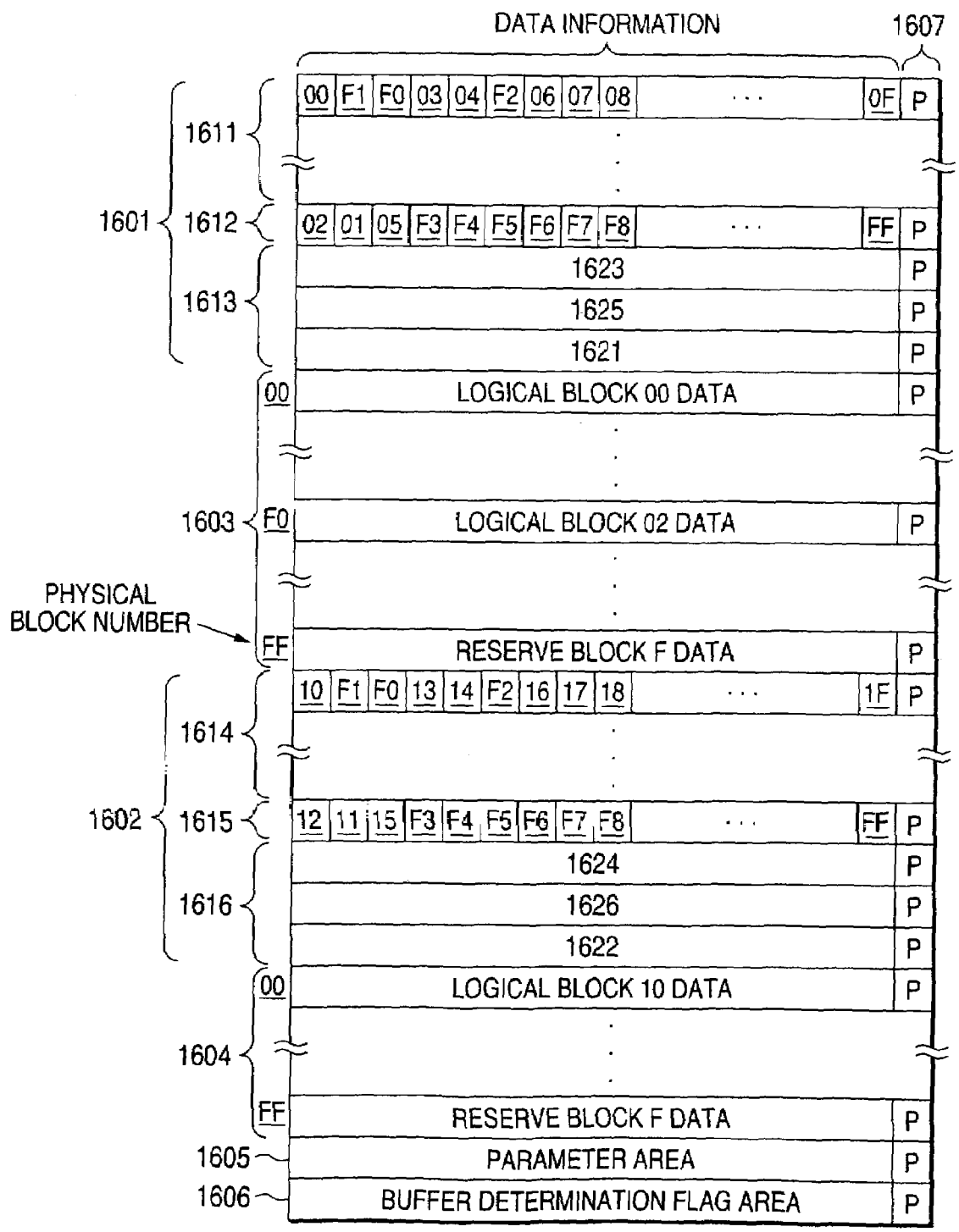
FIG. 16 is a diagram showing a memory structure in a physical memory space according to the embodiment.

The nonvolatile memory 109, in the physical memory space, has the file structure shown in FIG. 16, the actual memory structure. Included in the physical memory space are the address management areas A1601 and B1602 and the data areas A1603 and B1604. And in the address management area A1601, there is a data block address management area A1611 for managing the block numbers of logical data blocks, a reserve block address management area A1612 for managing the block numbers of reserve data blocks, and a block number holding area A1613 for recording block numbers when the process for writing or reading block data is performed. Similarly, the address management area B1602 includes a data block address management area B1614, reserve block address management area B1615 and a block number holding area B1616.

In addition, the nonvolatile memory 109 has a parameter area 1605 for storing various parameters, including writing-in-progress information and reading-in-progress information used for data updating, and a buffer determination flag area 1606 for storing a flag that designates an address management area to be updated during the updating process performed for the address management area B1602.

In this embodiment, since the data area is divided into multiple area segments, and since the number of blocks in the data area A1603 and the number of blocks in the data area B1604 are set equal to or smaller than 256, the block data in the corresponding address management area a1601 and the address management area B1602 can be managed by using one byte block numbers.

The data blocks in the data block area A1501 and the reserve block area A1503 in the logical memory space in FIG. 15 are correlated with each other, in the physical memory space in FIG. 16, by the block numbers in the address management area A1601, and these data blocks are stored in the data area A1603, where they coexist. Similarly, the data blocks in the data block area B1502 and the reserve block area B1504, in the logical memory space in FIG. 15, are correlated in the physical memory space in FIG. 16 by using the block numbers in the address management area B1602, and these data blocks are stored in the data area B1604, where they coexist.

In the physical memory space shown in FIG. 16, the logical data blocks in the data block area A1501 in the logical memory space in FIG. 15 are recorded in the data area A1603, while being correlated by using the block numbers in the data block address management area A1611 in the address management area A1601. Further, in the physical memory space in FIG. 16, the reserve data blocks in the reserve block area A1503 in the logical memory space in FIG. 15 are recorded in the data area A1603, while being correlated with the block numbers of the reserve block address management area A1612 of the address management area A1601. In addition, in the physical memory space in FIG. 16, the logical data blocks in the data block area B1502 in the logical memory space in FIG. 15 are recorded in the data area B1604, while being correlated by using the block numbers of the data block address management area B1614 in the address management area B1602. Furthermore, in the physical memory space in FIG. 16, the reserve data blocks in the reserve block area B1504 in the logical memory space in FIG. 15 are recorded in the data area B1604, while being correlated by using the block numbers in the reserve block address management area B1615 in the address management area B1602.

The block number holding area A1613 in the address management area A1601 has a logical block number holding area A1621 for holding a logical block number designated by a command for the block data writing/reading process, a physical block number holding area A1623 for holding a physical block number that corresponds to the designated logical block number, and a reserve block number holding area A1625 for holding a reserve block number whereat are stored write data to be added to a response packet for the writing process and read data to be added to a response packet for the reading process. Similarly, the block number holding area B1616 in the address management area B1602 has a logical block number holding area B1622, a physical block number holding area B1624 and a reserve block number holding area B1626. Also, error check data (parity data) 1607 are stored for each data block in order to determine or confirm whether the values of the block data in the nonvolatile memory 109 are correct.

While referring to FIG. 17, an explanation will now be given for the structures of the address management areas A1601 and B1602 and the buffer determination flag area 1606, and the contents of the control process.

The physical block numbers that correspond to logical block numbers 00, 01, . . . 0F are stored in the named order in the data block address management area A1611. In FIG. 17, since physical block number 00 is stored in consonance with logical block number 00 in the data block address management area A1611, logical data block 00, which is stored at logical block number 00 in the logical memory space, is stored at physical block number 00 in the physical memory space. Similarly, since physical block number F1 is stored in consonance with logical block number 01, logical data block 01, which is stored at logical block number 01 in the logical memory space, is stored at physical block number F1 in the physical memory space. For the data block address management area B1614, physical block numbers corresponding to logical block numbers 00 to 0F are similarly stored.

The physical block numbers corresponding to logical block numbers F0 to FF are stored in the reserve block address management areas A1612 and B1615, as well as in the data block address management areas A1611 and B1614. Since physical number 02 is stored in consonance with logical block number F0 in the reserve block address management area A1612, reserve data block 0, which is stored at logical block number F0 in the logical memory space, is stored at physical block number 02 in the physical memory space.

In this embodiment, the one byte physical block numbers are stored in the data block address management area A1611 and the reserve block address management area A1622, and the data block address management area B1614 and the reserve block address management area B1615.

Further, in this embodiment, since the total number of blocks in the data block area A1501 and the data block area B1502 is greater than 256 and is equal to or smaller than 512, the two byte logical block numbers are held in the logical block number holding area A1621. 16 logical block numbers can be stored in the logical block holding area A1621, and designated logical block numbers are stored in accordance with the number of data blocks to be written or read, and the data writing or the reading order. At this time, since the same data are stored in the logical block number holding area B1622, this area may not be provided. In addition, the logical block numbers may be converted into those that are equal to or smaller than 256 blocks, and the thus obtained numbers may be stored in the logical block number holding areas A1621 and B1622, so that the corresponding data areas A1604 and B1604 can be independently designated. It should be noted that the number of blocks that can be stored in the logical block number holding area A1621 and the logical block number holding area B1622 is not limited to 16.

16 one byte physical block numbers can respectively be stored in the physical block number holding areas A1623 and B1624. In accordance with the number of data blocks to be written or read, and the writing or reading order, physical block numbers are extracted sequentially, beginning with the first number, from the address management area A1601 or B1602 and are stored in the physical block number holding areas A1623 and B1624 in correlation with the designated logical block numbers. It should also be noted that the number of blocks that can be stored in the physical block number holding area A1623 and the physical block number holding area B1624 is not limited to 16.

16 one byte reserve block numbers can be respectively stored in the reserve block number holding areas A1625 and B1622. In accordance with the number of data blocks to be written or read, and the writing or reading order, physical block numbers are stored sequentially, beginning with the first number, in the reserve block number holding areas A1625 and B1626, in correlation with the logical block numbers stored in the reserve block area A1503 or B1504 in the logical memory space, where block data added to a write command or block data to be added to a read response are stored. It should also be noted that the number of blocks that can be held in the reserve block number holding area A1625 and in the reserve block number holding area B1626 is not limited to 16.

Since the logical block numbers, the physical block numbers and the reserve block numbers are held in this manner, even when the data writing process or the data reading process is interrupted when the power is cut off, the data state at the point at which the process was interrupted, or the original state, can be easily recovered, and the occurrence of a data error can be prevented.

Figure 18:
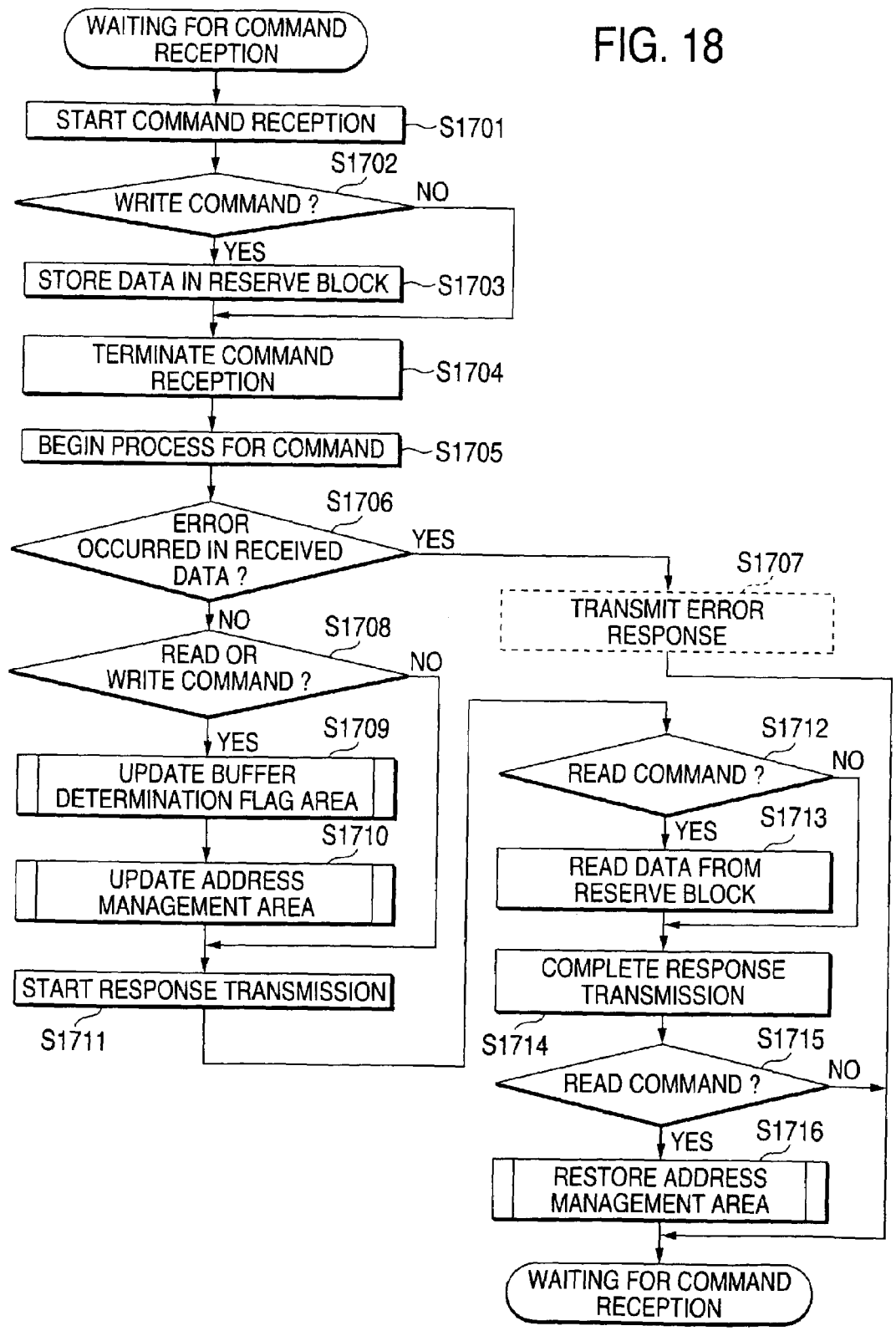
FIG. 18 is a flowchart showing the data processing for the embodiment.

The command processing for this embodiment will now be described while referring to the flowchart in FIG. 18.

When the reception of a command from the reader/writer 102 is started (step S1701), the IC card 101 examines the type of received command (step S1702). If the command is a write command, block data added to the command are stored in a reserve block, while command reception is continued (step S1703). At this time, block data to be written is stored in the block data at the physical block number indicated in the reserve block address management area. In this case, the same data are written in the reserve block area A1603 and the reserve block area B1504.

If the received command is not a write command, the process at step S1703 is skipped. Then, command reception is completed (step S1704) and a process corresponding to a command is performed (step S1705). When, as the result of another confirmation performed for the received data (step S1706), an error due to a transmission failure or an abnormality in a designated parameter is found, either an error response is transmitted (step S1707) and program control is shifted to a command waiting state, or program control is shifted to the command waiting state without an error response being transmitted.

When the individual process can be normally performed, the type of received command is determined (step S1708), and when a received command is neither a write command nor a read command, transmission of a response is started (step S1711). Then, when the response has been transmitted (step S1714), program control is shifted to a command waiting state. When the received command is a write command, the process for updating the buffer determination flag area, which will be described later, is begun (step S1709), and the address management area corresponding to the write command is updated (step S1710). Thereafter, the transmission of a response is begun (step S1711), and after the response transmission has been completed (step S1714), program control is shifted to the command waiting state.

When the received command is a read command, the buffer determination flag area is updated (step S1709), and the address management area corresponding to the read command is updated (step S1711). Thereafter, the transmission of a response is started (step S1711), block data are read from the reserve block that has been rewritten through the updating process, and a response is transmitted (steps S1712 and S1713). When the transmission of the response has been completed (step S1714), and the address management area has been restored (step S1715 and S1716), program control is shifted to the command waiting state.

Figure 19:
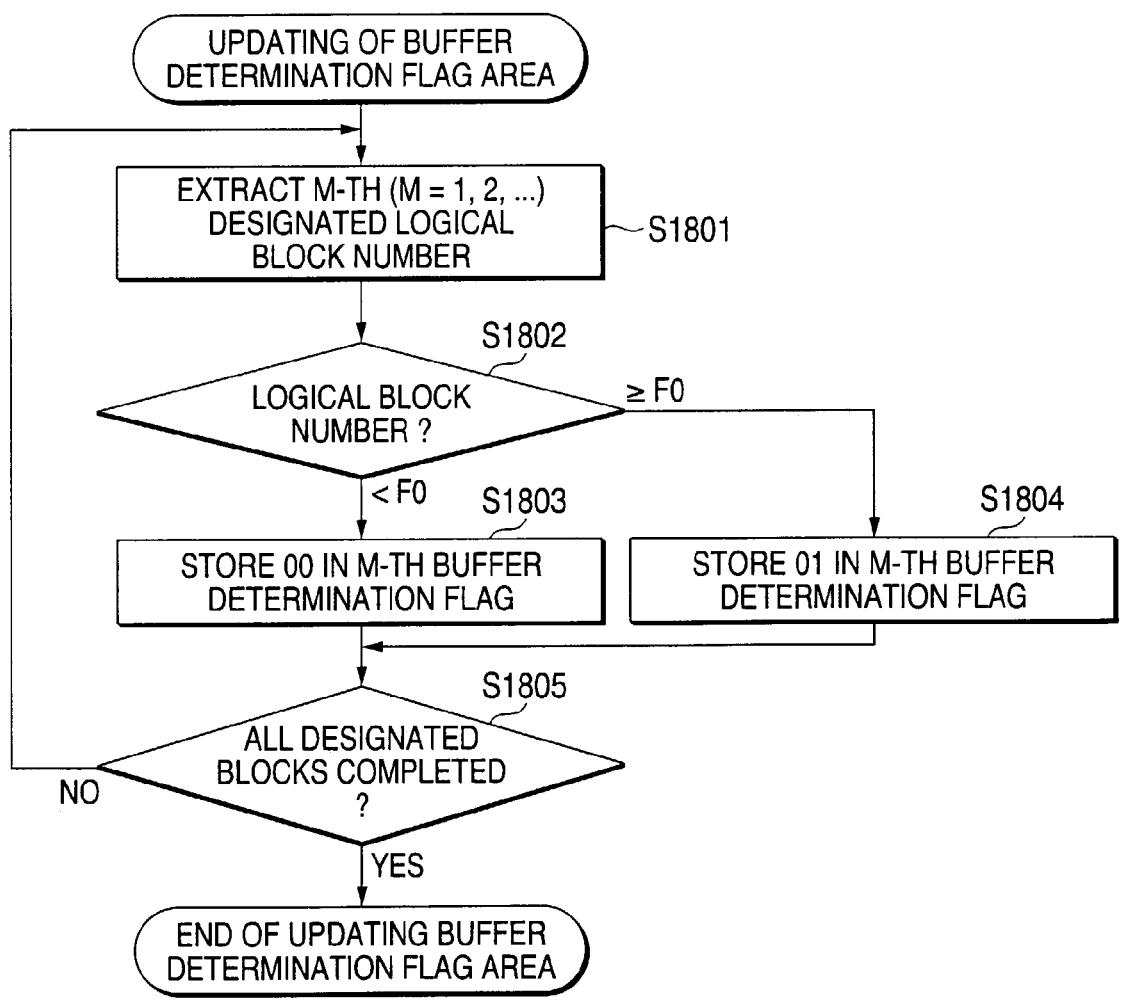
FIG. 19 is a flowchart showing the processing for updating a buffer determination flag area according to the embodiment.

The process at step S1709 in FIG. 18 for updating the buffer determination flag area will now be described while referring to the flowchart in FIG. 19.

First, the logical block numbers designated by a command are extracted, beginning with the first (step S1801), and a check is performed to determine whether the M-th (M=1, 2, . . . ) logical block number is equal to or greater than F0 (step S1802). In this embodiment, since the number of blocks in each of the data block area segments is defined as F0, by employing the process at step S1802 for determining the logical block number, a check is performed to determine whether a data block designated for writing is associated with the data block area A1501 or the data block area B1502.

When the designated logical block number is smaller than F0, 00 is written to the corresponding M-th buffer determination flag (step S1803), or when the logical block number is equal to or greater than F0, 01 is written to the corresponding M-th buffer determination flag (step S1804). Then, a check is performed to determine whether all the designated blocks have been processed (step S1805). Until the processing for all the blocks designated by the command has been completed, the processes at step S1801 to S1804, for writing data to the buffer determination flags, are repeated.

Figure 17:
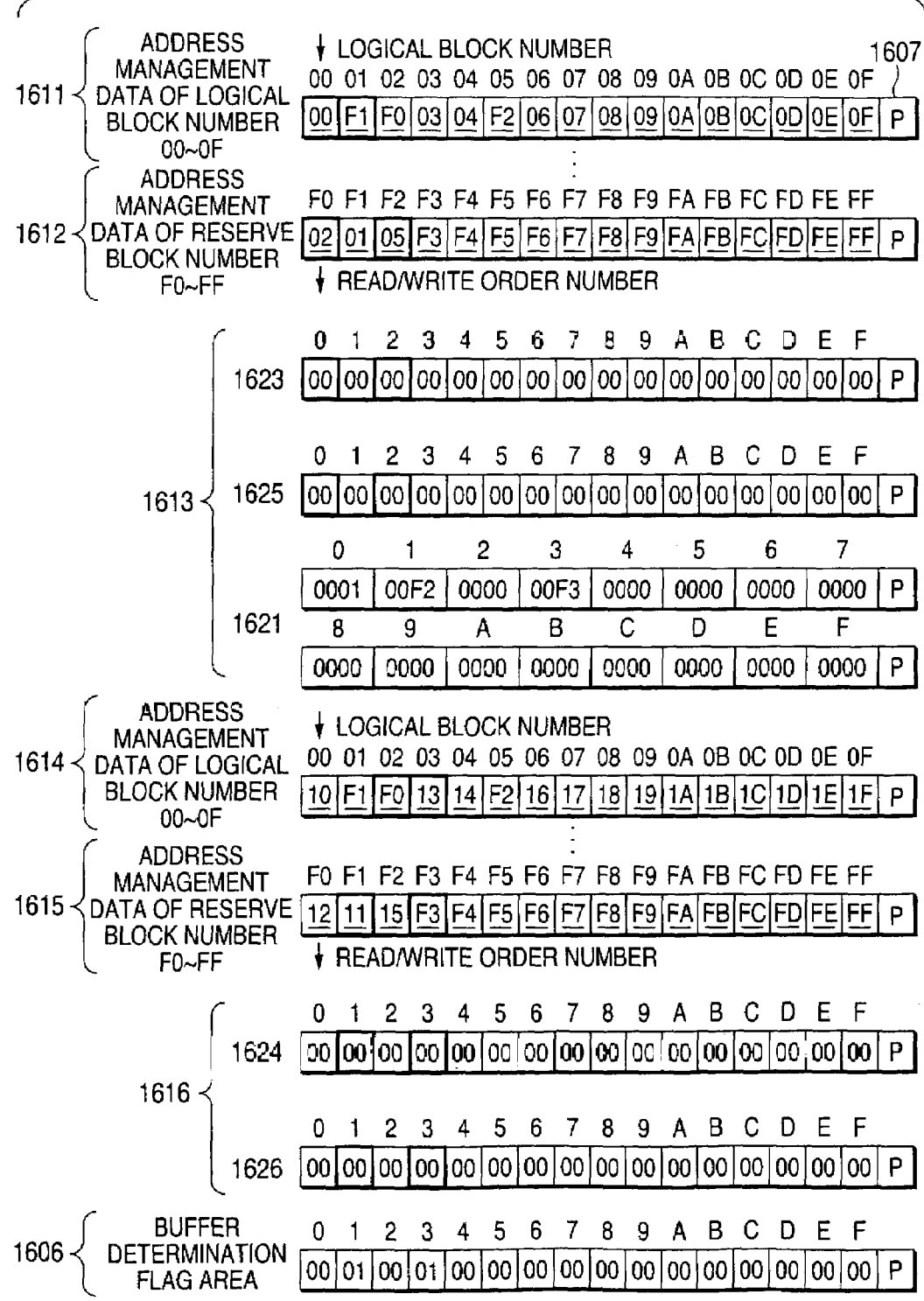
FIG. 17 is a diagram showing an address management area in the physical memory space according to the embodiment.

In the example in FIG. 17, logical blocks are designated in a command in order to write data in the order 0001, 00F2, 0000 and 00F3. In this example, by performing the process for updating the buffer determination flag area, the values of the flags are stored in the buffer determination flag area 1606 in the order 00, 01, 00 and 01.

The process at step S1710 in FIG. 18 for updating the address management area will now be described while referring to the flowchart in FIG. 20. First, as the process performed upon receiving a write command, an explanation will be given for the processing whereby logical block numbers 0001, 00F2, 0000 and 00F3 are designated in the named order and are alternately written, one by one, to the data block area A1501 and the data block area B1502, so that a total of two data blocks are stored in each data block area. It should be noted that the memory structure in FIG. 17 is in the state existing before the write command for the writing process was received.

During the process for updating the address management area, first, a check is performed to determine whether the process is for a write command or a read command (step S1901). When the process is for a write command, logical block numbers are held (step S1902). In this embodiment, the designated logical block numbers, 0001, 00F2, 0000 and 00F3, are recorded in the named order in the logical block number holding area A1621 in FIG. 17. The logical block numbers may be held in the same manner in the logical block number holding area B1622.

Following this, based on the value held by the buffer determination flag in the buffer determination flag area 1606, the address management area A1601 or the address management area B1602 is selected as the area for which the holding process or the updating process is performed for the individual block numbers (step S1903). Thereafter, the physical block numbers are held in the physical block number holding area A1623 or B1624 in the selected area (step S1904). The physical block numbers, which correspond to the designated logical block numbers 0001, 00F2, 0000 and 00F3, are F1, F0, 00 and 13, as indicated by thick walled frames in the data block address management areas A1611 and B1614 in FIG. 17. And these physical block numbers are alternately recorded, in order, in the physical block number holding areas A1623 and B1624.

Further, the reserve block numbers are stored in the reserve block number holding area A1625 or B1626 in the selected area (step S1905). In the example in FIG. 17, before the process is performed, 02 and 05, indicated by thick walled frames, are the physical block numbers for the first and third blocks in the reserve block address management area A1612, while 11 and F3, also indicated by thick walled frames, are the physical block numbers for the second and fourth blocks in the reserve block address management area B1615. Therefore, these physical block numbers are respectively stored in the reserve block number holding areas A1625 and B1626. Further, the number of "write" blocks (N=4) (corresponds to the number of written blocks and the total number of updated blocks) is stored in the parameter area 1605 of the nonvolatile memory 109 (step S1906).

Next, the writing process count value (M=0) (corresponds to the number of updated blocks) is incremented by one, and the obtained value (M=1) is stored in the parameter area 1605 of the nonvolatile memory 109 (step S1907). Then, the physical block number corresponding to the M-th (M=1) writing process is updated (step S1908). In this embodiment, physical block number F1, which corresponds to the first logical block number 01 in the data block address management area A1611, is updated by writing thereto physical block number 02 for the corresponding first reserve block. Furthermore, the reserve block number corresponding to the M-th (M=1) writing process is updated (step S1909), and in this case, physical block number F1, for the first data block, is written in place of the corresponding first physical block number 02 in the reserve block address management area A1612, and the physical block numbers of the data block and the reserve block are rewritten and mutually exchanged.

Figure 21:
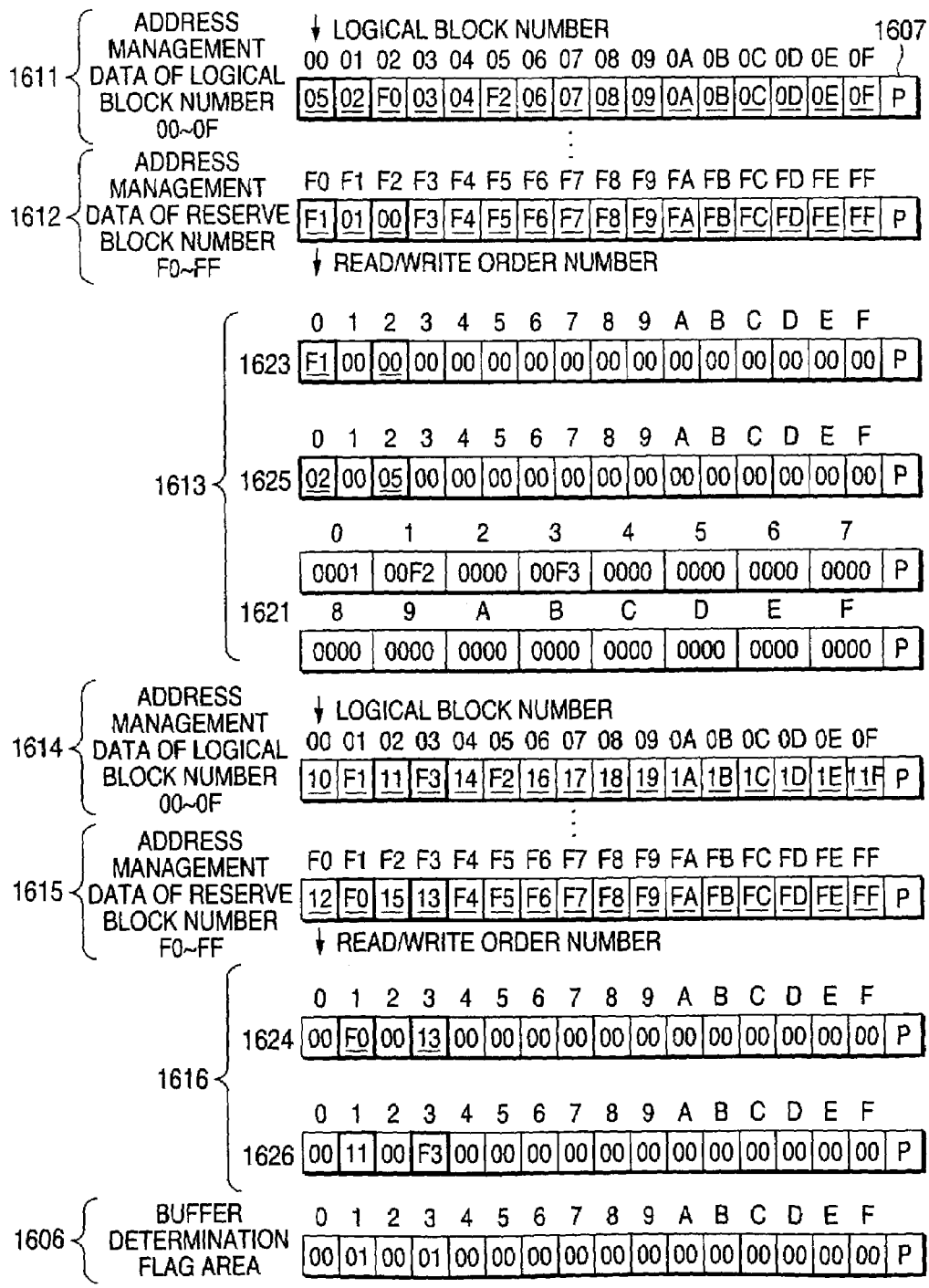
FIG. 21 is a diagram showing the structure, after the writing process is completed, of the address management area in the physical memory space according to the embodiment.

Thereafter, the writing-in-progress information obtained based on the number of "write" blocks and the writing process counter value are examined to determine whether the writing process has been completed (N=M) (step S1910). When the writing process has not yet been completed, program control returns to step S1907 and the writing process counter value is incremented by one. Further, the physical block numbers of the second data block and the second reserve block in the target area are rewritten and mutually exchanged (steps S1907 to S1909). When the writing process has been completed, the writing process counter value is cleared (M=0) (step S1911) and the updating of the address management areas A1601 and B1602 is terminated. The memory structure in the state wherein the writing process has been completed is shown in FIG. 21. Further, after the updating of the address management area has been completed, the response to the write command is transmitted.

The processing performed to update the address management area corresponds to the processing performed to write block data. Specifically, in the target data area, designated from among multiple data areas by the command, the block data to be written by write commands are temporarily stored in the reserve blocks, and the block numbers are rewritten to exchange, in the address management area, the logical block numbers designated by the write commands and the reserve blocks. As a result, the block data writing process can be completed, and the process for updating the block numbers in the address management area can be performed more rapidly than is possible with the conventional block data writing process.

Further, in the individual data areas in this embodiment, F0 to FF are fixed, logical block numbers for the reserve block areas wherein block data designated for the writing process are stored. Therefore, since the writing and reading processes are repeatedly performed for the same logic block numbers, and since the storage of the block data in the reserve block areas is performed substantially parallel to the transmission of received data, time for writing the block data is essentially not required, and the writing process speed can be increased.

When the power is cut off during the writing process, the writing process counter value (M) in the parameter area 1605 of the nonvolatile memory 109 is not cleared (≠0) because the writing process has not been completed. Therefore, the writing process counter value (M) is examined when the power is restored, so that whether the power was cut off during the writing process can be determined.

When the processing is resumed for a writing process that has not been completed, unprocessed block numbers are updated, based on the number of "write" blocks and the writing process counter value stored in the parameter area 1605, the block numbers held in the block number holding areas A1613 and B1616, and the flag value stored in the buffer determination flag area 1606, so that the writing process can be completed.

An explanation will now be given for the processing, performed upon receiving a read command, wherein logical block numbers 0001, 00F2, 0000 and 00F3 are designated in the named order, and wherein data blocks are alternately read, one by one, from the data block areas A1501 and B1502, i.e., a total of two data blocks are read from each data block area.

Figure 20:
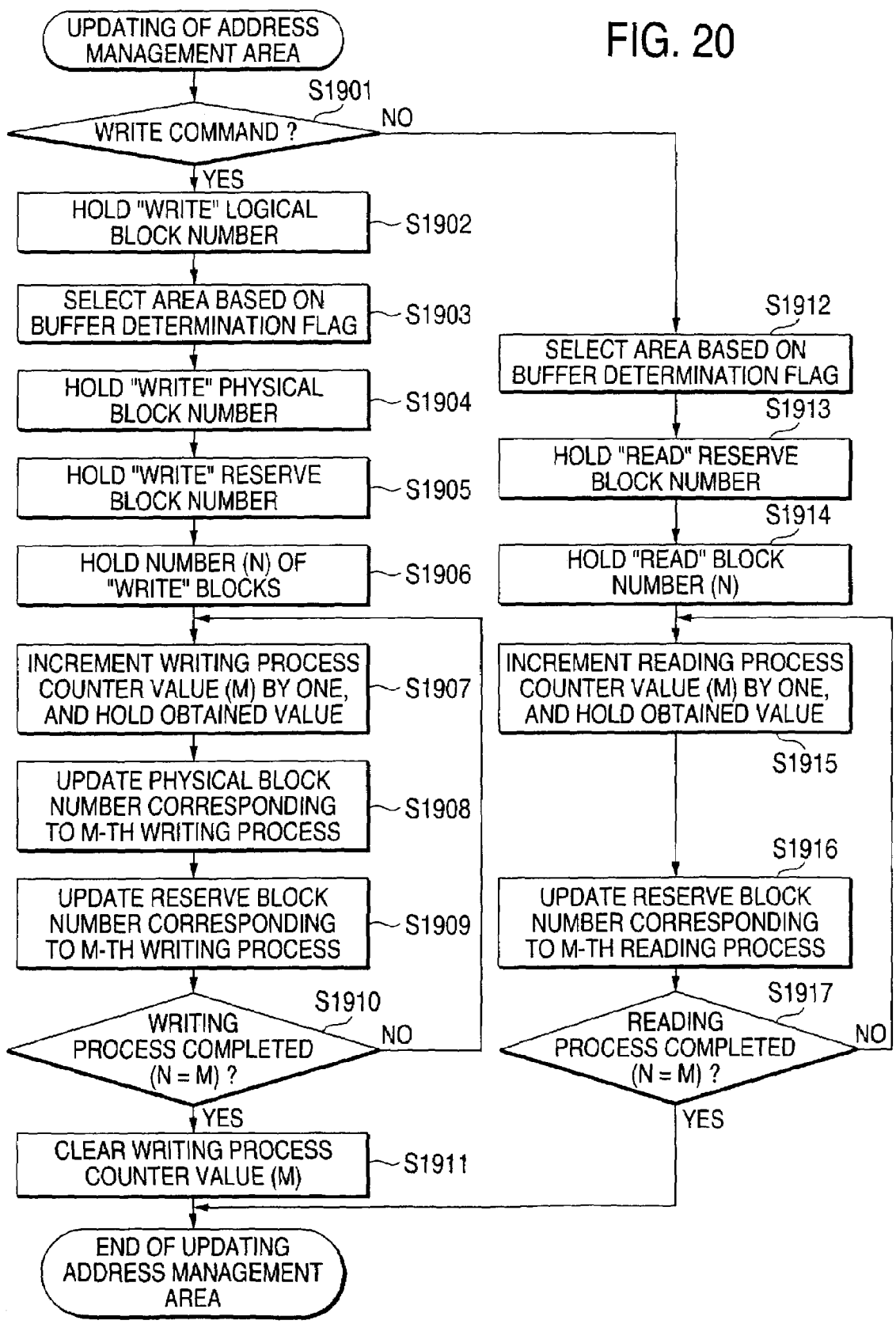
FIG. 20 is a flowchart showing the processing for updating an address management area according to the embodiment.

When as a result of the command determination performed at step S1901 in FIG. 20 it is found that the process is for a read command, in the same manner as in the write command process, the value stored for the buffer determination flag in the buffer determination flag area 1606 is employed to select either the address management area A1601 or the address management area B1602 as the area for which each block number is held or updated (step S1912).

Thereafter, the reserve block numbers are held in the reserve block number holding area A1625 or B1626 in the target area (step S1913). In the example in FIG. 17, before the process is performed, 02 and 05, indicated by thick walled frames, are set as the first and third physical block numbers in the reserve block address management area A1612, while 11 and F3, also indicated by thick walled frames, are set as the second and fourth physical block numbers in the reserve block address management area B1615. Therefore, these physical block numbers are stored in the reserve block number holding areas A1625 and B1626. Further, the number of "read" blocks (N=4) (corresponds to the number of blocks to be read or the total number of blocks to be restored) is held in the parameter area 1605 of the nonvolatile memory 109 (step S1914).

Next, the reading process counter value (M=0) (corresponds to the number of restored blocks) is incremented by one, and the value (M=1) is held in the parameter area 1605 of the nonvolatile memory 109 (step S1915). Then, the reserve block number corresponding to the M-th (M=1) reading process is updated (step S1916). In this case, the first block number 02 in the reserve block address management area A1612 is updated by writing thereto physical block number F1 for the corresponding first data block.

Thereafter, the reading-in-progress information obtained based on the number of "read" blocks and the reading process counter value are examined to determine whether the reading process has been completed (N=M) (step S1917). When the reading process has not yet been completed, program control returns to step S1915. Then, the reading process counter value is incremented by one, and the physical block number of the second reserve block in the target area is rewritten (steps S1915 and S1916). When the reading process has been completed, the updating of the address management areas A1601 and B1602 is terminated.

The writing process counter value (M) may also serve as the reading process counter value. (M), and the number (N) for the "write" blocks may also serve as the number (N) for "read" blocks, or alternatively, separate numbers may be provided for them.

After the updating of the address management area is completed, the response to the read command is transmitted. The block data to be read, which are added to the response dispatched for the read command, are block data at the physical block number designated in the reserve block address management area A1612 or B1615, and beginning with the reserve data block 0, data blocks equivalent in number to the "read" blocks are read and transmitted. Subsequently, after the response has been transmitted, the address management area is restored, and as a result, the physical block numbers in the reserve block address management areas A1612 and B1615 are returned to the state that existed before the read command was received.

The updating and the restoration of the address management area correspond to the processing performed to read block data. Specifically, in the target data areas designated from among multiple data areas by the command, the block number is rewritten to exchange, in the address management areas of the target areas, the logical blocks and the reserve blocks that are designated by the read command. Then, block data are read from the reserve blocks, and thereafter, to return to the original state, the block numbers for the reserve blocks and the logical blocks are rewritten. As a result, the process for reading block data is completed, and the updating and the restoration of the block numbers in the address management area are performed more rapidly than is possible with the conventional block data reading process.

In addition, since in this embodiment F0 and FF are fixed, logical block numbers in the reserve block areas wherein the block data designated for the reading process are stored in each data area, the reading process is always performed for the same logical block numbers. Further, since the reading of block data from the reserve block areas is performed substantially parallel to the data transmission process, time for reading block data is essentially not required, and the reading process speed can be increased.

Further, when a power cut-off occurs during the reading process, the reading process counter value (M) stored in the parameter area 1605 of the nonvolatile memory 109 is not cleared (≠0) because the reading process has not been completed. Therefore, since the reading process counter value (M) is examined when the power is restored, whether the power cut-off occurred during the reading process can be determined.

When the processing is resumed for a reading process that has not been completed, unprocessed block numbers are updated, based on the number of "read" blocks and the reading process counter value stored in the parameter area 1605, the block numbers stored in the block number holding areas A1613 and B1616 and the value of the flag in the buffer determination flag area 1606, so that the reading process can be completed.

As is described above, when the block numbers are to be held or updated during the processing performed to update the address management area in each of multiple data areas, the value of the buffer determination flag is read. When the value of the buffer flag is 00, only the address management area A1601 is updated, whereas when the value of the buffer flag is 01, only the address management area B1602 is updated.

In this case, the logical block numbers for the address management area A1505 match the logical block numbers in the logical memory space viewed from the reader/writer 102. The logical block numbers of the address management area B1506 are managed as values obtained by subtracting f0 from the logical block numbers in the logical memory-space viewed from the reader/writer 102. When 00F2 is designated by the write command as the second block, the logical block number and F0 are examined and it is determined that the address management area B1602 has been updated, and the result obtained, 00F2−00F0=0002, is used as the logical block number for this target area. Therefore, this processing is handled as the writing of data to the logical block 02 in the address management area B1602.

In the explanation provided for this processing, the same data are written in the reserve block area A1503 and the reserve block area B1504 as are employed for the process performed to store block data in the reserve blocks upon the reception of a write command. However, the storage process is not limited to this. As an example, by performing the target area determination process to update the buffer determination flag area, a logical block number added to the command may be employed to determine whether the designated block to be written is associated with the data block area A or the data block area B, and the data may be written only to the associated reserve block area.

Through the processing performed in this embodiment, the data writing and reading processes can be efficiently performed without the memory capacity for the address management area being drastically increased, even when the total number of blocks for managing data blocks exceeds 256, e.g., when the logical block numbers in the data block areas in the memory space are defined as extending up to 1DF. That is, in this embodiment, a large memory capacity is not required for system control, even for nonvolatile memory having a large data area, and the protection of data is ensured when a power cut-off occurs during a block data reading process or a block data writing process. Furthermore; the processing can be performed rapidly and efficiently.

As is described above, according to the present invention, the processing can be quickly and efficiently performed, while when power is cut off, protection of data recorded on the IC card is ensured.

As is also described above, according to the present invention, even when a large data block area is handled for an IC card, the processing can be rapidly and efficiently performed, and the protection of data is ensured, even when the power is cut off.

What is claimed is:

1. A data processing method for an IC card comprising the steps of:
    during a process for writing data to a memory of an IC card, storing write data received with a command in a buffer area of said memory; and
    rewriting, in an address management area for storing address data for said memory, by mutually exchanging address data that correspond to said buffer area and address data that correspond to a data storage area designated by the command, thereby updating said address management area.

2. A data processing method according to claim 1, further comprising the steps of:
    during said writing process, temporarily storing, in an address holding area, physical addresses that correspond to said buffer area and physical addresses that correspond to logical addresses for said data storage area designated by said command in said address management area;
    setting writing-in-progress information indicating that a writing process is currently being performed;
    rewriting physical addresses that correspond to said buffer area and physical addresses that correspond to said data storage area in said address management area, thereby updating said address management area; and restoring said writing-in-progress information after the updating has been completed.

3. A data processing method for an IC card comprising the steps of:

during a process for reading data from a memory of an IC card, updating an address management area by rewriting address data that correspond to a buffer area with address data that correspond to a data storage area designated by a command, said address management area being provided in a memory for storing address data; and reading read data from said buffer area that has been updated, and returning said address management area to an original state.

4. A data processing method according to claim 3, further comprising the steps of:

during said reading process, temporarily storing, in address holding area, physical addresses that are stored in address management area and that correspond to said buffer area;

setting reading-in-progress information indicating that a reading process is currently being performed;

performing the updating process by rewriting physical addresses that correspond to said buffer area with physical addresses that are stored in said address management area and that correspond to logical addresses in said data storage area designated by said command;

performing a restoring process after read data has been obtained from said buffer area that has been updated, with said physical addresses that were held and that correspond to said buffer area; and returning said reading-in-progress information to the original state after the restoring has been completed.

5. An IC card comprising:

a memory having a data storage area for storing data to be held, a buffer area for storing write data during a writing process, and an address management area for storing address data for correlating logical addresses and physical addresses associated with said data storage area and said buffer area; and memory control means for storing in said buffer area, during a data writing process for said memory, write data that are transmitted with a command, and for rewriting, in said address management area, address data that correspond to said buffer area and address data that correspond to said data storage area designated by said command, so that said address management area can be updated.

6. An IC card according to claim 5, wherein said memory includes:

an address holding area for holding target address data that are stored in said address management area and that are to be updated; and a parameter area for storing writing-in-progress information indicating that a writing process is currently being performed, and wherein during said writing process, based on a logical address designated by said command, said memory control means temporarily stores in said address holding area physical addresses that are stored in said address management area and that correspond to said buffer area, and physical addresses that are stored in said address management area and that correspond to logical addresses in said data storage area designated by said command; places said writing-in-progress information in said parameter area; performs the updating process for rewriting said physical addresses that correspond to said buffer area and physical addresses that correspond to said data storage area in said address management area; and returns said writing-in-progress information to the original state.

7. An IC card according to claim 6, wherein, during said writing process, said memory control means stores, in said parameter area, the total number of blocks to be updated in physical address and the number of currently updated blocks, both of which are used as said writing-in-progress information.

8. An IC card according to claim 7, wherein said memory control means examines said writing-in-progress information to determine whether said writing process has been completed; and wherein, when said writing process has not been normally performed, said memory control means resumes and completes the updating of unprocessed physical addresses based on the total number of blocks to be updated in physical address and the total number of updated blocks that are stored in said parameter area and said address data held in said address holding areas.

9. An IC card according to claim 5, wherein, during said writing process, said memory control means stores, in said buffer area, write data that is added to a command packet in parallel with a data transmission process.

10. An IC card according to claim 5, wherein, during said writing process, said memory control means calculates error check data for said write data, which is performed essentially parallel to the process for storing said write data in said buffer area, and stores said error check data in correlation with said write data.

11. An IC card according to claim 5, wherein, when data is to be read from or written to said data storage area and said buffer area, said memory control means is capable of switching between a method for directly designating a physical address and accessing data, and a method for using said address management area to convert a designated logical address into a physical address and accessing data.

12. An IC card comprising:

a memory having a data storage area for storing data to be held, a buffer area for storing write data during a writing process, and an address management area for storing address data that correlates logical addresses and physical addresses associated with said data storage area and said buffer area; and memory control means for rewriting, in said address management area during a data reading process performed for said memory, address data that correspond to said buffer area and address data that correspond to said data storage area designated by a command for said address management area, and updating said address management area, for reading read data stored in said buffer area that has been updated, and for returning said address management area to an original state.

13. An IC card according to claim 12, wherein said memory includes an address holding area for holding address data that are stored in said address management area and are to be updated, and a parameter area for storing reading-in-progress information indicating that a reading process is currently being performed, and wherein, during said reading process, said memory control means temporarily stores, in said address holding area, physical addresses that are stored in said address management area and that correspond to said buffer area; places said reading-in-progress information in said parameter area; performs the updating process for rewriting said physical addresses that correspond to said buffer area with physical addresses that correspond to said logical addresses of said data storage area designated by said command for said address management area; reads said read data from said buffer area that has been updated, and returns said physical addresses that have been stored and that correspond to said buffer area; and returns said reading-in-progress information to the original state.

14. An IC card according to claim 13, wherein, during said reading process, said memory control means stores, in said parameter area, the total number of blocks to be restored with respect to physical addresses and the number of currently restored blocks, both of which are used as said reading-in-progress information.

15. An IC card according to claim 14, wherein said memory control means employs said reading-in-progress information to determine whether said reading process has been completed; and wherein, when said reading process has not been normally performed, said memory control means resumes and completes the restoring of unprocessed physical addresses based on the total number of blocks to be restored and the total number of blocks restored for said physical addresses that are stored in said parameter area, and address data held in said address holding area.

16. An IC card according to claim 12, wherein, during said reading process, said memory control means reads read data from said buffer area, and adds said read data to a command packet in parallel with a data transmission process.

17. An IC card according to claim 12, wherein, during said reading process, said memory control means determines error check data for said read data, which is performed essentially parallel to the process for reading said read data from said buffer area, and when a data error is found, adds said error check data as abnormality data to a response packet.

18. An IC card according to claim 12, wherein, when data is to be read from or written to said data storage area and said buffer area, said memory control means is capable of switching between a method for directly designating a physical address and accessing data, and a method for using said address management area to convert a designated logical address into a physical address and accessing data.

19. An IC card comprising:
a memory having a plurality of data storage areas for storing data to be held, a plurality of buffer areas for storing write data during a writing process, and a plurality of address management areas for storing address data for correlating logical addresses and physical addresses associated with said plurality of data storage areas and said buffer areas; and
memory control means for storing in said plurality of buffer areas, during a data writing process for said memory, write data that are transmitted with a command, and for rewriting, in said plurality of address management areas, address data that correspond to said plurality of buffer areas and address data that correspond to said plurality of data storage areas designated by said command, so that said plurality of address management areas can be updated.

20. An IC card according to claim 19, wherein said memory includes
address holding areas for holding address data that are stored in said plurality of address management areas and that are to be updated,
a buffer determination flag area for storing buffer area validity data indicating one of said plurality of buffer areas being valid, and
a parameter area for storing writing-in-progress information indicating that a writing process is currently being performed; and
wherein, during said writing process, based on a logical address designated by said command, said memory control means selects one target data storage area and one target buffer area to which data are to be written; stores in said buffer determination flag area validity data designating said target areas; temporarily stores in said address holding areas physical addresses that correspond to said buffer areas, and physical addresses that are stored in said plurality of address management areas and that correspond to logical addresses in said plurality of data storage areas designated by said command; places said writing-in-progress information in said parameter area; performs the updating process, based on validity data in said buffer determination flag area, for rewriting said physical addresses that correspond to said plurality of buffer areas and physical addresses that correspond to said plurality of data storage areas in said plurality of address management area for said target areas that are valid; and returns said writing-in-progress information to the original state.

21. An IC card according to claim 20, wherein said memory control means examines said writing-in-progress information to determine whether said writing process has been completed; and wherein, when said writing process has not been normally performed, said memory control means resumes and completes the updating of unprocessed physical addresses based on the total number of blocks to be updated in physical addresses and the total number of updated blocks that are stored in said parameter area, said address data held in said address holding areas and said validity data stored in said buffer determination flag area.

22. An IC card comprising:
a memory having a plurality of data storage areas for storing data to be held, a plurality of buffer areas for storing write data during a writing process, and a plurality of address management areas for storing address data that correlates logical addresses and physical addresses associated with said plurality of data storage areas and said plurality of buffer areas; and
memory control means for rewriting, in said plurality of address management areas during a data reading process performed for said memory, address data that correspond to said plurality of buffer areas and address data that correspond to said plurality of data storage areas designated by a command, and updating said plurality of address management area, for reading read data stored in said plurality of buffer areas that have been updated, and for returning said plurality of address management areas to an original state.

23. An IC card according to claim 22, wherein said memory includes
address holding areas for holding address data that are stored in said plurality of address management areas and are to be updated,
a buffer determination flag area for storing buffer area validity data indicating one of said plurality of buffer areas being valid, and a parameter area for storing reading-in-progress information indicating that a reading process is currently being performed; and wherein, during said reading process, said memory control means employs logical addresses designated by said command to select one target storage area and one target buffer area from which data are to be read; stores, in said buffer determination flag area, validity data designating said target areas; temporarily stores, in said address holding areas, physical addresses that are stored in said plurality of address management areas and that correspond to said plurality of buffer areas; places said reading-in-progress information in said parameter area; performs the updating process, based on said validity data in said buffer determination flag area, for rewriting said physical addresses that correspond to said plurality of buffer areas, with physical addresses that correspond to said logical addresses of said data storage areas designated by said command in an address management area for the valid target areas; reads said read data from said plurality of buffer areas that have been updated, and returns said physical addresses that have been stored and that correspond to said plurality of buffer areas; and returns said reading-in-progress information to the original state.

24. An IC card according to claim 23, wherein said memory control means employs said reading-in-progress information to determine whether said reading process has been completed; and wherein, when said reading process has not been normally performed, said memory control means resumes and completes the restoring of unprocessed physical addresses based on the total number of blocks to be restored with respect to for physical addresses and the total number of blocks restored that are stored in said parameter area, address data held in said address holding areas and said validity data in said buffer determination flag area.

25. A data processing method for an IC card comprising the steps of:

during a process for writing data to a memory of an IC card, storing write data received with a command in buffer areas of said memory;

employing a logical address designated by said command to select, from among a plurality of storage areas and a plurality of buffer areas, a target storage area and a target buffer area to which data are to be written, and storing validity data designating said plurality of target areas in a buffer determination flag area;

temporarily storing, in address holding areas, physical addresses that correspond to said plurality of buffer areas and physical addresses and that correspond to logical addresses for said data storage areas designated by said command in address management areas for storing address data for said memory;

setting writing-in-progress information indicating that a writing process is currently being performed;

rewriting physical addresses, based on validity data in said buffer determination flag area, that correspond to said plurality of buffer areas and physical addresses that correspond to said plurality of data storage areas in said address management area, for said valid target areas, thereby updating said address management area; and restoring said writing-in-progress information after the updating has been completed.

26. A data processing method for an IC card comprising the steps of:

during a process for reading data from a memory of an IC card, employing a logical address designated by a command to select, from among a plurality of data storage areas and a plurality of buffer areas, a target data storage area and a target buffer area from which data are to be read, and storing in a buffer determination flag area validity data designating said target areas;

temporarily storing, in address holding areas, physical addresses that are stored in address management areas of said memory for storing address data and that correspond to said target buffer areas;

setting reading-in-progress information indicating that a reading process is currently being performed;

based on said validity data in said buffer determination flag area, updating said address management area for said valid target areas by rewriting physical addresses that correspond to said plurality of buffer areas with physical addresses that are stored in said address management area and that correspond to logical addresses in said plurality of data storage areas designated by said command;

performing a restoring process, after read data have been obtained from said buffer areas that have been updated, with said physical addresses that were held and that correspond to said plurality of buffer areas; and returning said reading-in-progress information to the original state after the restoring has been completed.

* * * * *